United States Patent
Edwards et al.

(10) Patent No.: US 6,353,820 B1
(45) Date of Patent: Mar. 5, 2002

(54) METHOD AND SYSTEM FOR USING DYNAMICALLY GENERATED CODE TO PERFORM INDEX RECORD RETRIEVAL IN CERTAIN CIRCUMSTANCES IN A RELATIONAL DATABASE MANAGER

(75) Inventors: David S. Edwards, Glendale; Todd Kneisel, Phoenix, both of AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/408,986

(22) Filed: Sep. 29, 1999

(51) Int. Cl.[7] .............................................. G06F 17/30
(52) U.S. Cl. ................................ 707/2; 707/4; 707/10; 707/101; 709/215; 711/100; 711/216; 714/11
(58) Field of Search ............................... 707/1, 2, 3, 4, 707/5, 10, 101, 102, 103 R, 104.1, 206; 709/201, 215, 216; 711/4, 100, 112, 150, 171, 200, 202, 216, 217; 714/11; 705/35

(56) References Cited

U.S. PATENT DOCUMENTS 5,283,894 A * 2/1994 Deran ............................ 707/1
5,408,652 A * 4/1995 Hayashi et al. ................ 707/1

(List continued on next page.)

OTHER PUBLICATIONS

Database Products INTEREL Reference Manual INTEREL Performance Guidelines GCOS 8, Copyright Bull HN Information Systems Inc. 1996, Order No. LZ93 REV01B.

Choy, David et al., "A Distributed Catalog for Heterogeneous Distributed Database Resurces", Proceedings of the First International Conference on Parallel and Distributed Information Systems, Dec. 4–6, 1991, IEEE, pp. 236–244.*

More, Sachin et al., "Extended Collective I/O for Efficient Retrievel of Large Objects", HIPC '98, 5th International Conference on High Performance Computing, Dec. 17–20, 1998, pp. 359–366.*

Primary Examiner—Hosain T. Alam
Assistant Examiner—Shahid Alam
(74) Attorney, Agent, or Firm—Faith F. Driscoll; John S. Solakian

(57) ABSTRACT

A system and method that enhances the index processing performance of a multi-layer relational database manager by expanding the code generation component layer of the database manager to include an index processing performance enhancing subroutine designed to execute functions performed by lower component layers substantially faster than if the functions were executed by such lower component layers. The subroutine includes logic for establishing the conditions under which the particular subroutine is invoked during the execution of a SQL request. The output code generated to execute a specific SQL query, including calls to the index processing subroutine in place of normally included calls to the lower component layer. This enables the generated code to perform lower component layer functions with specialized code designed to increase performance.

18 Claims, 7 Drawing Sheets

U.S. PATENT DOCUMENTS

| | | | | |
|---|---|---|---|---|
| 5,544,355 A | * | 8/1996 | Chaudhuri et al. | 707/2 |
| 5,555,388 A | * | 9/1996 | Shaughnessy | 711/100 |
| 5,659,727 A | * | 8/1997 | Velissaropoulos et al. | 707/2 |
| 5,706,495 A | * | 1/1998 | Chadha et al. | 707/2 |
| 5,717,919 A | * | 2/1998 | Kodavalla et al. | 707/8 |
| 5,724,569 A | * | 3/1998 | Andres | 707/2 |
| 5,794,228 A | * | 8/1998 | French et al. | 707/2 |
| 5,794,229 A | * | 8/1998 | Fench et al. | 707/2 |
| 5,812,996 A | * | 9/1998 | Rubin et al. | 707/2 |
| 5,822,749 A | * | 10/1998 | Agarwal | 707/2 |
| 5,873,099 A | * | 2/1999 | Hogan et al. | 707/204 |
| 5,918,225 A | * | 6/1999 | White et al. | 707/3 |
| 5,956,706 A | * | 9/1999 | Carey et al. | 707/2 |
| 6,073,129 A | * | 6/2000 | Lavine et al. | 707/4 |
| 6,115,703 A | * | 9/2000 | Bireley et al. | 707/2 |
| 6,175,835 B1 | * | 1/2001 | Shadmon | 707/102 |
| 6,192,370 B1 | * | 2/2001 | Primsch | 707/103 R |
| 6,202,070 B1 | * | 3/2001 | Nguyen et al. | 707/104.1 |
| 6,233,569 B1 | * | 5/2001 | Lehitinen | 706/10 |
| 6,240,422 B1 | * | 5/2001 | Atkins et al. | 707/102 |
| 6,240,428 B1 | * | 5/2001 | Yeung et al. | 707/206 |
| 6,289,334 B1 | * | 9/2001 | Reiner et al. | 707/3 |

* cited by examiner

METHOD AND SYSTEM FOR USING DYNAMICALLY GENERATED CODE TO PERFORM INDEX RECORD RETRIEVAL IN CERTAIN CIRCUMSTANCES IN A RELATIONAL DATABASE MANAGER

RELATED PATENT APPLICATIONS

1. A Method and System For Using Dynamically Generated Code to Perform Record Management Layer Functions in a Relational Database Manager invented by David S. Edwards, David A. Egolf and William L. Lawrance, filed on even date, bearing Ser. No. 09/408,985 and assigned to the same assignee as named herein.
2. A Method and System For Dynamically Generating Code to Enhance the Performance of a Relational Database Manager That Provides Access to a Relational Database invented by David S. Edwards, David A. Egolf and William L. Lawrance, filed on even date, bearing Ser. No. 09/408,767 and assigned to the same assignee as named herein.

BACKGROUND OF THE INVENTION

1. Field of Use

The present invention relates to data processing systems and more particularly to database management systems.

2. Prior Art

Typically, today's enterprise or legacy systems store large quantities of data in database systems accessed by database management system (DBMS) software. In such database systems, data is logically organized into relations or tables wherein each relation can be viewed as a table where each row is a tuple and each column is a component of the relation designating an attribute. It has become quite common to use relational database management systems (RDMS) for enabling users to enter queries derived from a database query language, such as SQL, into the database in order to obtain or extract requested data.

In compiling type database management systems, an application program containing database queries is processed for compilation prior to run time. This can be done and more frequently is done at run time by users of the INTEREL product discussed herein. Users of other database products such as DB2, do such processing prior to run time.

During compilation, database queries are passed to the database management system for compilation by a database management system compiler. The compiler translates the queries contained in the application program into machine language. Generally, a database compiler component referred to, as a query optimizer is included in the database management system to select the manner in which queries will be processed. The reason is because most users do not input queries in formats that suggest the most efficient way for the database management system to address the query. The query optimizer component analyzes how best to conduct the user's query of the database in terms of optimum speed in accessing the requested data. That is, the optimizer typically transforms a user query into an equivalent query that can be computed more efficiently. This operation is performed at compile time, in advance of execution.

A major component of the RDBMS is the database services component or module that supports the functions of SQL language, such as definition, access control, retrieval and update of user and system data. Such components may utilize a multilayer structure containing submodules or components for carrying out the required functions. For example, one such system includes a series of components or conceptually, a series of layers for carrying out the required functions for accessing data from the relational database. More specifically, a first layer functions as a SQL director component that handles requests at the interface to the requesting or calling application program. A second layer consists of two major components, an optimizer for optimizing the query and a RAM code generation component. The optimizer processes the query by for example, by determining the appropriate access plan strategy. The code generation component (Codgen) generates code according to such plan for accessing and processing the requested data. The access plan defines the type of access to each table, order of access, whether any sorts or joins are performed along with other related information.

The generated code is passed to a third layer that functions as a relational file manager (RFM) component. This component layer performs the relational file processing function of translating the code-generated requests into IO file read/write requests. A fourth layer that functions as an IO Controller performs the requested I/O operation designated by such IO file requests that results in reading/writing the relational database files in page increments. The described architecture is characteristic of the INTEREL product developed and marketed by Bull HN Information Systems Inc. For information concerning this product, reference may be made to the publication entitled, "Database Products INTEREL Reference Manual INTEREL Performance Guidelines, Copyright, 1996 by Bull HN Information as Systems Inc., Order No. LZ93 Rev01B.

It was noted that index searches are very common operations in relational databases. They occur when processing SELECT, UPDATE or DELETE statements. Because they occur so frequently, it is an area where performance improvement could result in a substantial benefit for a relational database system such as the above architecture. For example, the above architecture processes the following typical query as follows:

Select accountID from tableFunds where accountBalance>=50000;

With DDL:

create table tableFunds (accountId int, accountBalance numeric(11,0)

create index i1 on tableFunds (accountBalance);

After an examination of this query, it is seen that many accounts may qualify. Because the index is on the accountBalance column and index data is sorted order, the query would be processed in the following manner. First, the index entry for 50,000 must be retrieved, then the subsequent index entries (i.e., all for accountBalances of 50,000 or greater) must be retrieved until the index is exhausted.

The above architecture performs index processing in the following two steps. First, the Codegen component layer calls the RFM component layer to search for a specific index value. This is called a Find Index search which is used to locate the database key (DBK) of a record from an index key value provided by the caller (i.e. user's search request). Once the RFM component layer finds the index entry, it establishes a currency to it. This currency is control information that indicates which fine level index entry corresponds with the search request. This currency information is stored in the RFM component layer's schema structure. The RFM component layer establishes a currency ID for the currency from currency ID information that the code generation component layer sets in an RFM data structure (RFM_XPT) prior to the call.

In the second step, the Codegen component layer calls the RFM component layer to return the next index entry (i.e., Search Next Index entry). The index fine level entries are in sorted order and because the Codegen layer passes in the currency ID from the prior search, the RFM layer can go to the currency information stored in the schema structure and use it to find the next index entry without repeating the index search. After the RFM layer has identified the next index entry, it updates the currency information in the schema. This second step is repeated until query processing is complete. This process is quite time consuming in terms of the overhead expended in invoking/calling lower component layers to perform index processing.

Accordingly, it is a primary object of the present invention to provide a more efficient method and system for improving relational index processing.

SUMMARY OF THE INVENTION

The above objects are achieved in a preferred embodiment of the present invention that can be utilized in a relational database management System (RDMS) that implements the Structured Query Language (SQL) standard. The present invention is a system and method that enhances the index processing performance of a multi-layer relational database manager. According to the teachings of the invention, the code generation component layer of the database manager includes an index processing performance enhancing subroutine designed to execute functions performed by lower component layers substantially faster than if the functions were executed by such lower component layers. The output code generated by the code generation component layer includes calls to the index processing performance enhancing subroutine thereby incorporating such subroutine into the output code.

The subroutine includes logic for establishing the conditions under which the particular subroutine is invoked during the execution of a SQL request. In the preferred embodiment, the logic detects when there is more than one search next index operation is requested for a particular query. On the second search next index request, the subroutine logic examines a fine level index page (CI) from which the prior index entry was retrieved. This CI was obtained by RFM during the initial B Tree index search and resides in the buffer pool. If there have been no changes in index currency and in the fine level index, then the subroutine copies the fine level index entry to the requestor's key buffer along with a database key value. Also, the currency information is updated to point to the next fine level index entry.

When the logic detects the presence of above conditions, this eliminates having to make calls to the lower component layers (i.e., RFM and IO component layers), thus bypassing these layers. This results in substantial increase in performance.

It will be appreciated that not all sequential index searches processed by the output code and that the enhanced index processing subroutine will be able to bypass the lower component layers. That is, it is still necessary to call the layer that performs I/O operations (i.e., IO component layer) while doing a sequential index search if more than one result is required to be processed. This occurs in the case where a result is returned in response to a SELECT statement used in conjunction with a FETCH cursor statement and a subsequent query issues an index search to an identical index in another database (model).

To protect against any possible page (CI) integrity problem, the IO component layer must be called to refresh the fine level index CI pointer once the first or original search request is resumed. But, even for the case where the IO component layer must be called, performance is still greatly enhanced by bypassing the RFM component layer. According to the present invention, at code generation time, the code generation component layer places into the output code generated for a particular query, the control logic for determining when a result has been processed and for setting a result processed flag indicator. Those types of queries that do not return a result or return only a 1 result will not have the code generated for them that sets the result processed flag. Queries that fall into this category are DELETE, UPDATE and SELECT INTO (e.g. SELECT COUNT(*)).

The above objects and advantages of the present invention will be better understood from the following description when taken in conjunction with the accompanying drawings.

BRIEF DESCRIPTION OF THE DRAWINGS

FIG. 3a is a block diagram illustrating in greater detail, the major components of the second layer of the RDMS of FIG. 2a.

FIG. 3c illustrates the operational relationships between the second and third layers of the RDMS of FIG. 2a.

DESCRIPTION OF THE PREFERRED EMBODIMENT

FIG. 1

Figure 1:
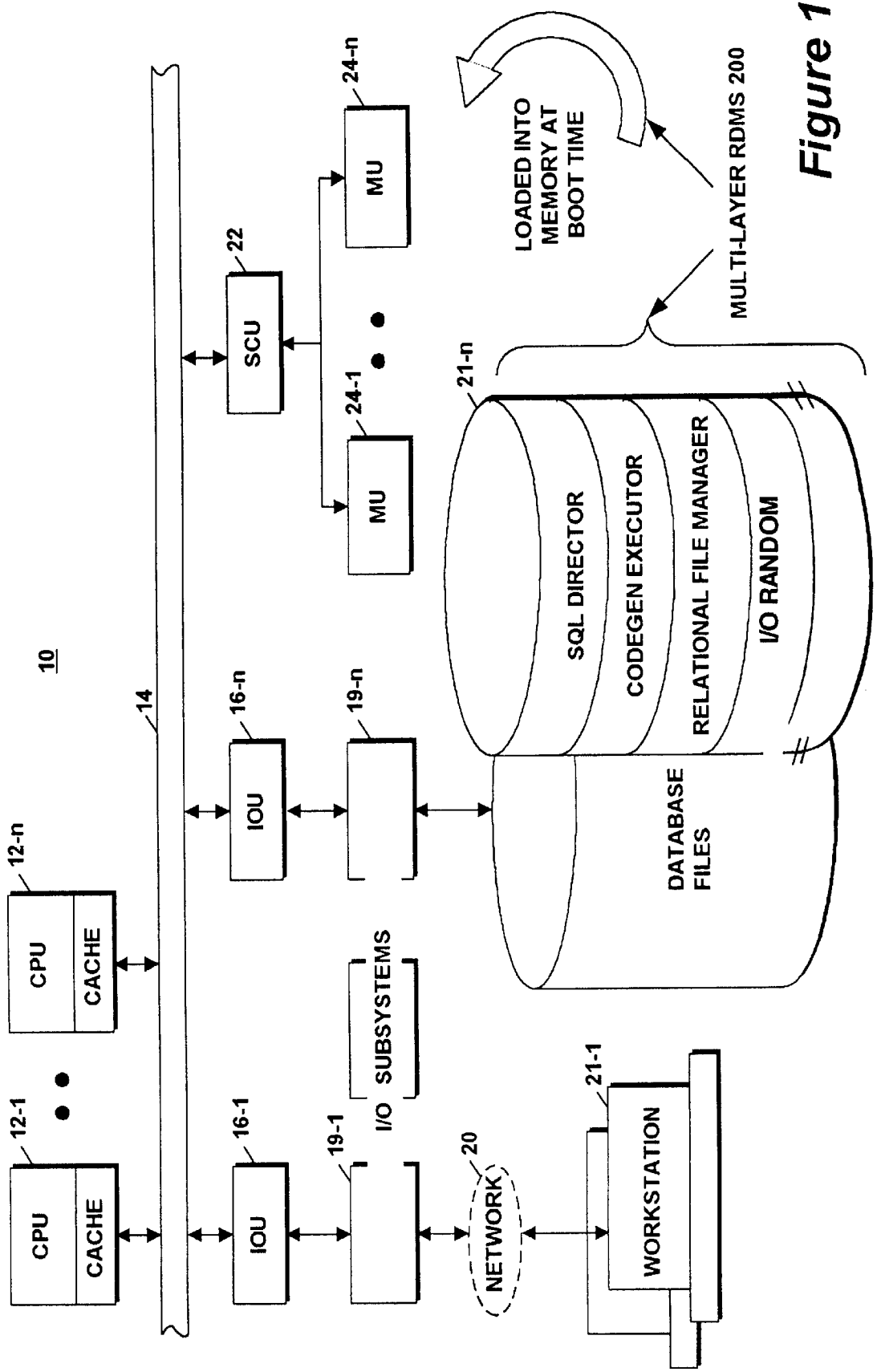
FIG. 1 is an overall block diagram of a data processing system that utilizes the teachings of the present invention.

FIG. 1 is a block diagram of a conventional data processing system 10 that utilizes the system and method of the present invention. As shown, the system 10 includes a plurality of processing units 12-1 through 12-n which connect to a system bus 14 through their individual physical caches in common with a number of input/output units (IOUs) 16-1 through 16-n and a system control unit (SCU) 22. As shown, each IOU couples to a particular I/O subsystem (i.e., 19-1 through 19-n) which in turn connect to any one of a number of different types of devices both local and remote such as workstation 21-1 via a network 20 or disk mass storage units 21-n as indicated.

The SCU 22 connects to a number of memory units (MUs) 24-1 through 24-n. For the purpose of the present invention, system 10 may be considered conventional in design and may for example utilize a mainframe computer system such as the DPS9000 manufactured by Bull HN Information Systems Inc. which operates under the control of the GCOS8 operating system.

As shown, the system 10 further includes disk storage 21-n that contains the database system that utilizes the teachings of the present invention. It will be appreciated that the software components that comprise the database system including the software components of the present invention may be loaded into the system 10 in a conventional manner (e.g. via CDROM, disk, communications link, etc.). The database system includes a multi-layer relational database management system (RDMS) and a relational database containing established data files. The relational database management system processes all user requests for accessing the files contained on disk storage 21-n. Users initiate such requests via the network 20 by executing transaction processing routines or batch decision support programs via their workstation keyboard and/or via other input devices (e.g. mouse). The system 10 upon receiving an SQL query operates to initiate a search of the relational database files to obtain the data requested by the user.

In system 10, the relational database management system (RDMS) takes the form of the above mentioned INTEREL software which runs under the GCOS8 operating system. As shown, the RDMS contains a SQL Director component layer, a Codegen Executor component layer, a Relational File Manager (RFM) component layer and an IO Random Controller component layer. These component layers are shown in greater detail, in FIG. 2 along with other database related components.

Figure 2:
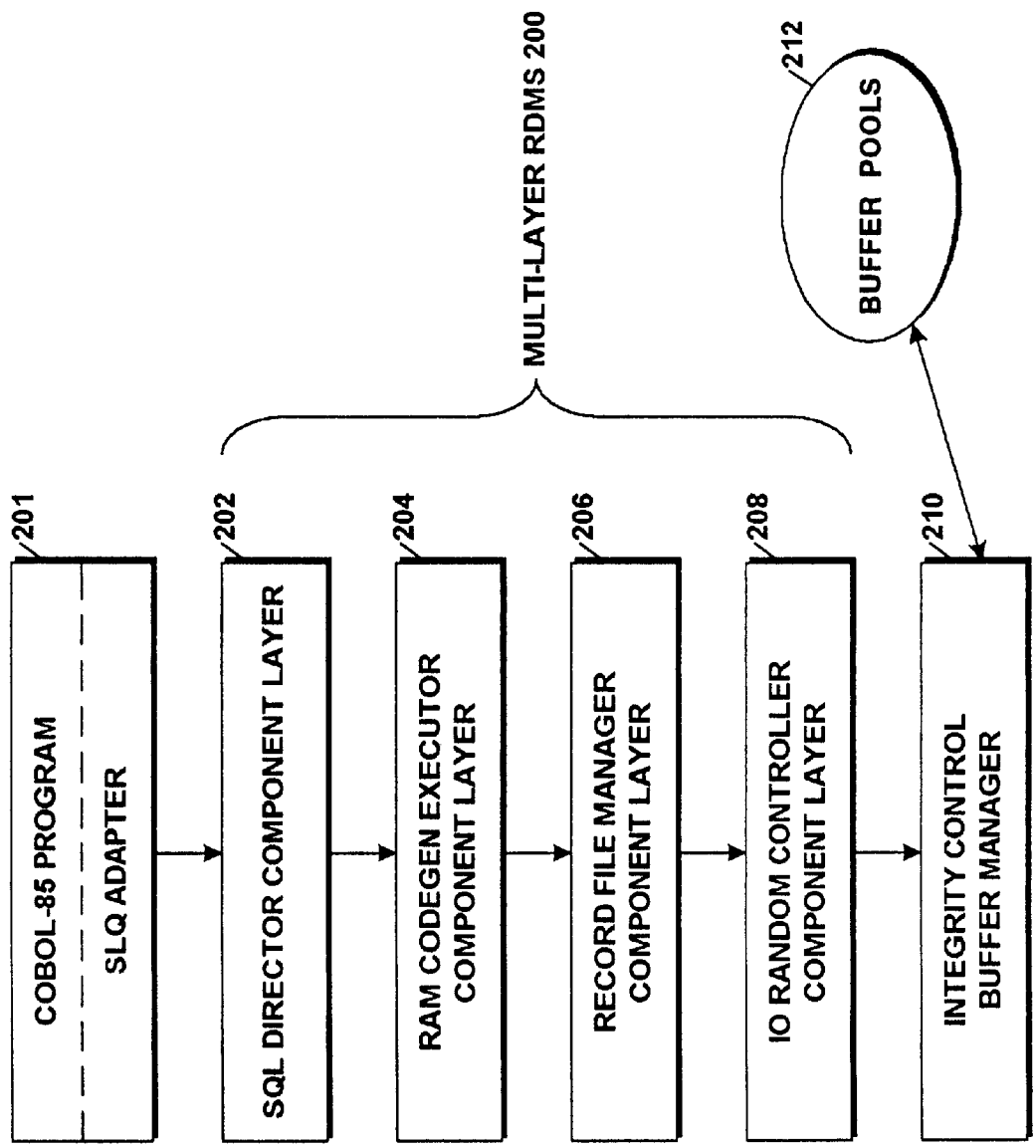
FIG. 2 is a block diagram illustrating the multi-layer organization of the relational database manager system (RDMS) of FIG. 1.

FIG. 2—Multi-layer RDMS Organization

FIG. 2 depicts the major components of the RDMS that utilizes the teachings of the present invention. As shown, these components include the four component layers of RDMS 200 (INTEREL software) discussed above. During normal operation, the different software components of RDMS 200 including the components of the present invention are loaded from disk storage 21-n into memory (e.g. MU 24-1) in a conventional manner.

In greater detail, SQL Director Component layer 202 operatively couples to an SQL adapter 201 that serves as the application's interface to the RDMS 200. The SQL Adapter 201 includes a runtime library that contains runtime routines bound into the application used by an application such as a COBOL-85 program for issuing calls. Each such call results in library sending a query statement to the SQL Director component layer 202.

The SQL Director component layer 202 handles the interface processing between RDMS 200 and a calling program. Thus, it manages the database connection. Layer 202 contains routines which analyze each query statement for determining if the statement is of a type that accesses relational database files and thus is suitable for code generation and caching. Each process utilizes a "local cache" for such storage. The use of "local caches" is discussed in the above referenced INTEREL Reference manual. Additionally, reference may be made to the copending patent application of Donald P. Levine and David A. Egolf, entitled: A Method and Apparatus for Improving the Performance of a Database Management System Through a Central Cache Mechanism, bearing Ser. No. 08/999,248 filed on Dec. 29, 1997 which is assigned to the same assignee as named herein.

As indicated, the SQL Director component layer 202 operatively couples to the RAM Codegen Executor Component layer 204. The SQL Director component layer 202 also contains routines that generate calls to a cache manager component to see if the code for that statement can be found in the process's local cache. When code for that statement is not found in the local cache, the SQL Director component layer 202 calls the RAM Codegen Executor Component layer 204 to process and "potentially" execute the query statement.

The RAM Codegen Executor layer 204 processes the SQL query. If the code has been generated for a particular query, layer 204 executes such code. When code has not been generated for a particular query, layer 204 optimizes the SQL query, generates code according to the optimized access plan and processes the requested data. The generated output code for the particular query is stored in "local cache" and executed.

As shown, the RAM Codegen Executor Component layer 204 operatively couples to the Relational File Manager component layer 206. During execution, the generated code calls various RFM functions to read or write relational data and/or index information from RFM files. Hence, this layer does not deal with the physical storage of data in a file.

The RFM component layer 206 performs the relational processing for RDMS 200. It receives the read and write requests from layer 204 and then translates them into IO file read and write requests respectively. It processes the file pages (CIs) read by layer 208 to which it operatively couples. Thus, this layer hides the physical storage of data and all other file format details from layer 204.

The IO Random Controller component layer 208 receives the requests from layer 206 and performs the relational file processing of translating the code-generated requests into I/O read/write requests. It processes the database files in page increments (CI). It is oblivious to physical storage of the data on the page. These details are handled by the other components illustrated in FIG. 2a. That is, layer 208 operatively couples to Buffer pools 212 via an Integrity Control Buffer Manager component 210. As known in the art, buffer pools contain buffers having a specific page size (control interval (CI). These buffers are used by the RDMS files. This arrangement is discussed in the above-mentioned INTEREL reference manual.

Figure 3A:
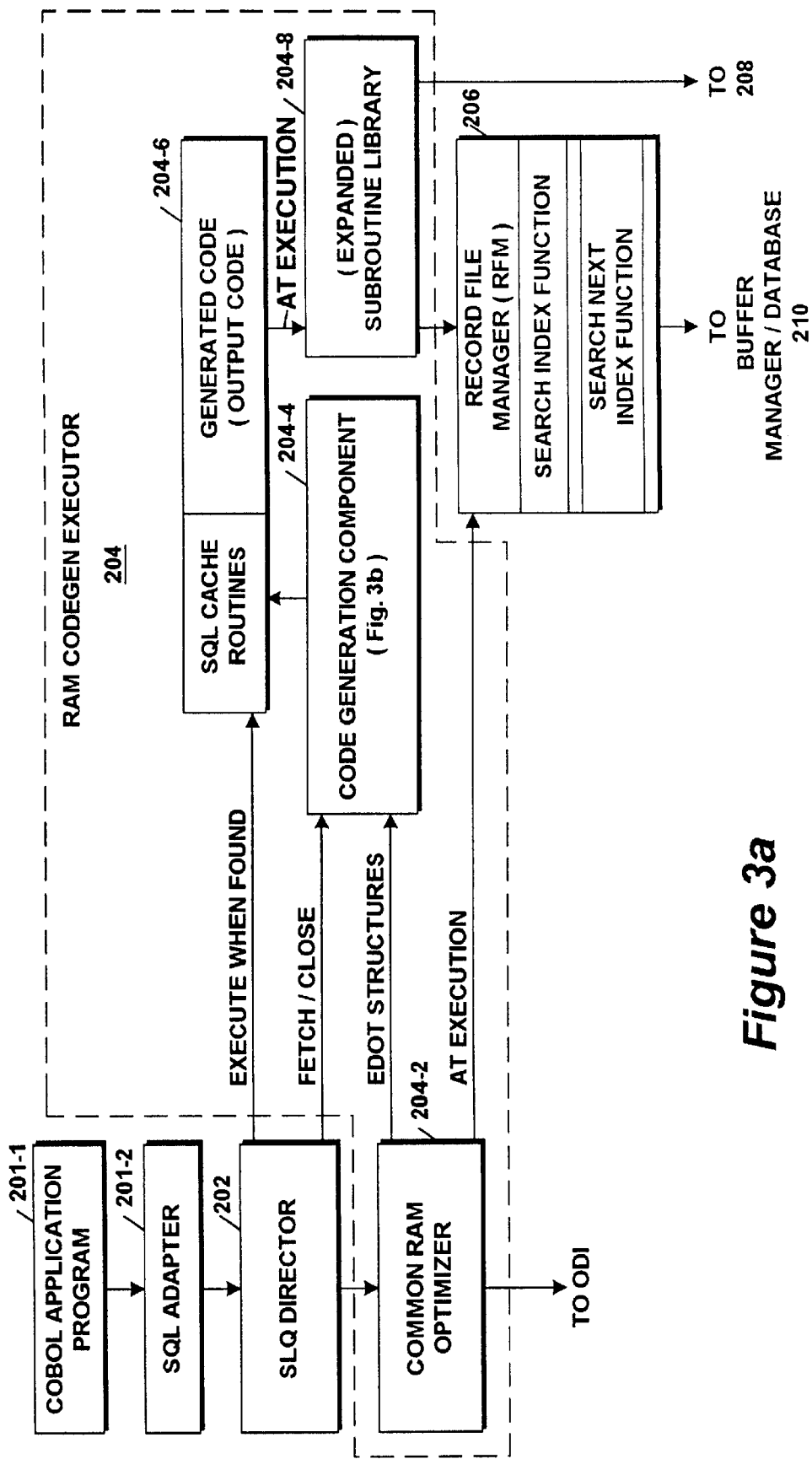

RAM Codegen Executor Layer 204—FIG. 3a

This figure illustrates in greater detail, specific components utilized according to the teachings of the present invention. As indicated, the layer 204 includes a common RAM Optimizer component 204-2, a code generation component 204-4, an SQL cache memory component 204-6 for storing SQL cache routines and generated code and subroutine library component 204-8. These components are operatively coupled as shown.

As discussed above, optimizer component 204-2 processes the SQL query by determining the appropriate access plan strategy. As a result of such processing, component 204-2 generates a set of EDOT structures that define the operation (SQL query) to execute (e.g. SELECT, UPDATE, INSERT or DELETE), the data to process (e.g. columns), the access method to use (e.g. scan or index or hash) and the restrictions that apply versus the access method to limit the amount of data (or rows) to process. Also, the structures define where the data obtained for the query is to be returned to a user. The path to ODI is used only during EDOT generation for verifying the query for correctness (e.g. does a specified column belong to a specified table). As indicated, the EDOT structures are applied as inputs to Code generation component 204-4. This component generates the required code that is stored in cache storage 204-6.

The cache storage 204-6 operatively couples to a subroutine library 204-8. Library 204-8 contains subroutines for communicating with RFM component layer 206 that operatively couples to buffer manager 210. In accordance with the teachings of the present invention, library 204-8 also includes an index processing enhancing subroutine that allows the bypassing of the RFM component layer 206 and IO component layer 208 as discussed herein. In this case, library 204-8 operatively couples to IO component layer 208 as indicated in FIG. 3a.

As indicated in FIG. 3a, the RFM component layer 206 includes several different types of record and index functions. The index functions include a Search Index function and a Search Next Index function. The Search Index function is used to locate the database key (DBK) of a record from an index key value provided by a caller in response to a user's search request. When the key value in the index satisfying the request contains pointers to multiple records (i.e., a duplicated key), the low DBK in the duplicate list will be returned along with a duplicate count. The caller may request one of the following three types of searches against the provided key value: equal, equal/greater than, or equal/less than. Optionally, this function will call an RFM record function (i.e., RFM retrieve record function) on the caller's behalf to return the record containing the index key value.

The Search Next Index function is used to return next key information to the calling program based upon a currency that has been previously established for the index against which this call is issued. When the current index key value is duplicated, DBKs will be returned from the duplicate list until the list is exhausted. Initial index currency can be established by the search index, store key, delete key and modify key functions. Optionally, this function also will call the RFM retrieve record function on the caller's behalf to return the record associated with the index key value.

Figure 3B:
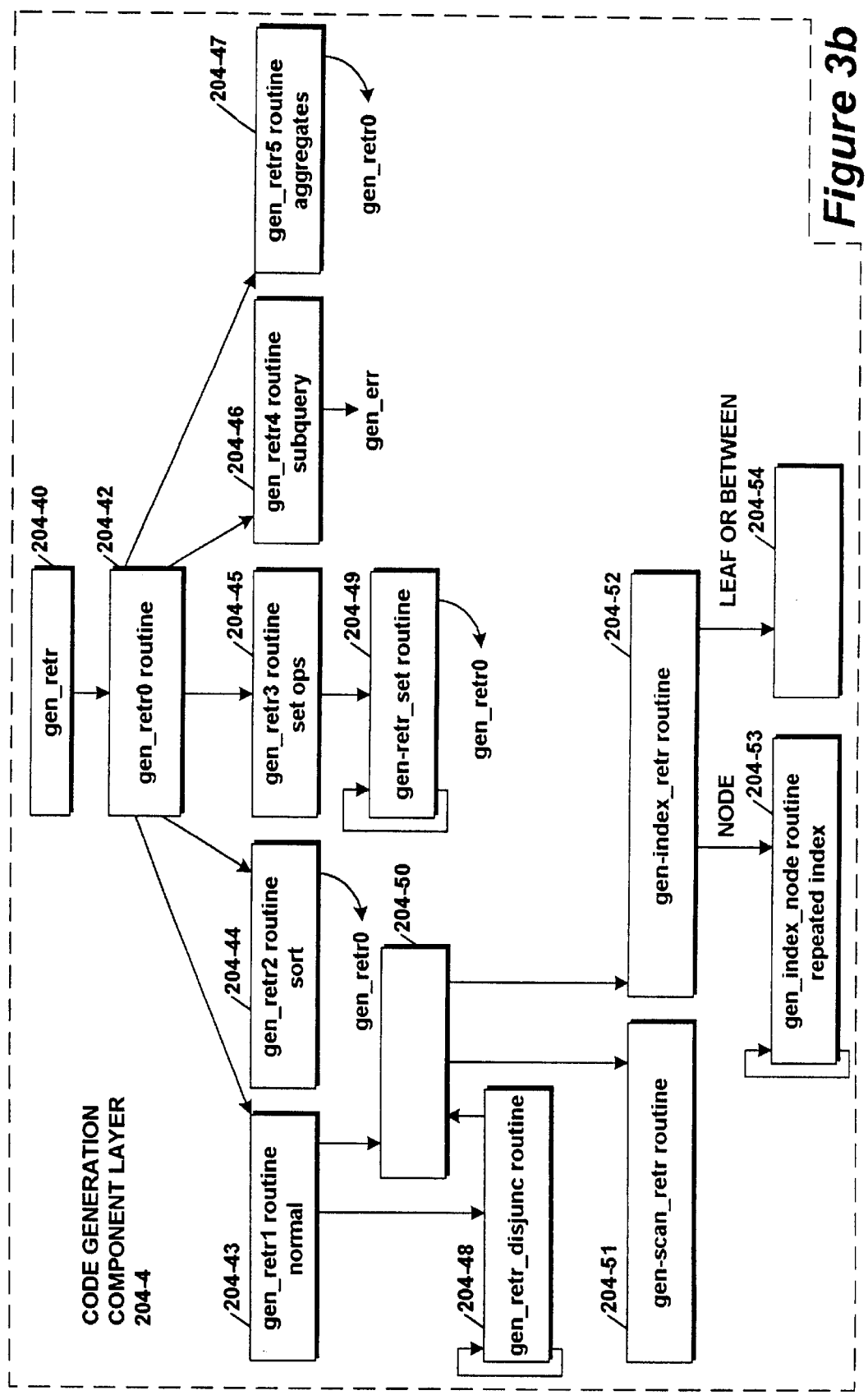
FIG. 3b is a block diagram illustrating in greater detail, the code generation component of FIG. 2 designed to utilize the teachings of the present invention.

Code Generation Component 204-4—FIG. 3b

FIG. 3b illustrates in greater detail, the structure of a portion of component 204-4 according to the present invention. More specifically, FIG. 3b depicts the routines that generate the code to perform index or data file retrievals. These routines include a number of standard routines that correspond to blocks 204-40 through 204-49 and 204-53. Additionally, the routines gen_retr_method function 204-50 and gen_index leaf have been extended. The subroutine gen_retr_method 204-50 generates the code to call the high speed row retrieval subroutine for enhancing data row retrieval performance. This subroutine is described in greater detail, in the second referenced copending patent application. The subroutine 204-50 incorporates into the code, any information that is necessary for carrying out the functions of the bypassed RFM manager component 206.

According to the teachings of the present invention, the subroutine gen_index_leaf 204-54 produces output code that calls the index performance enhancing routine for executing indexing operations under conditions defined by such routine. Appendix IV illustrates this structure in greater detail in generating code for a cursor open (SELECT) command.

Description of Operation

With reference to FIGS. 1 through 3b, the operation of the preferred embodiment of the present invention will now be described with reference to FIGS. 3c, 4a and 4b.

FIG. 3c

Figure 3C:
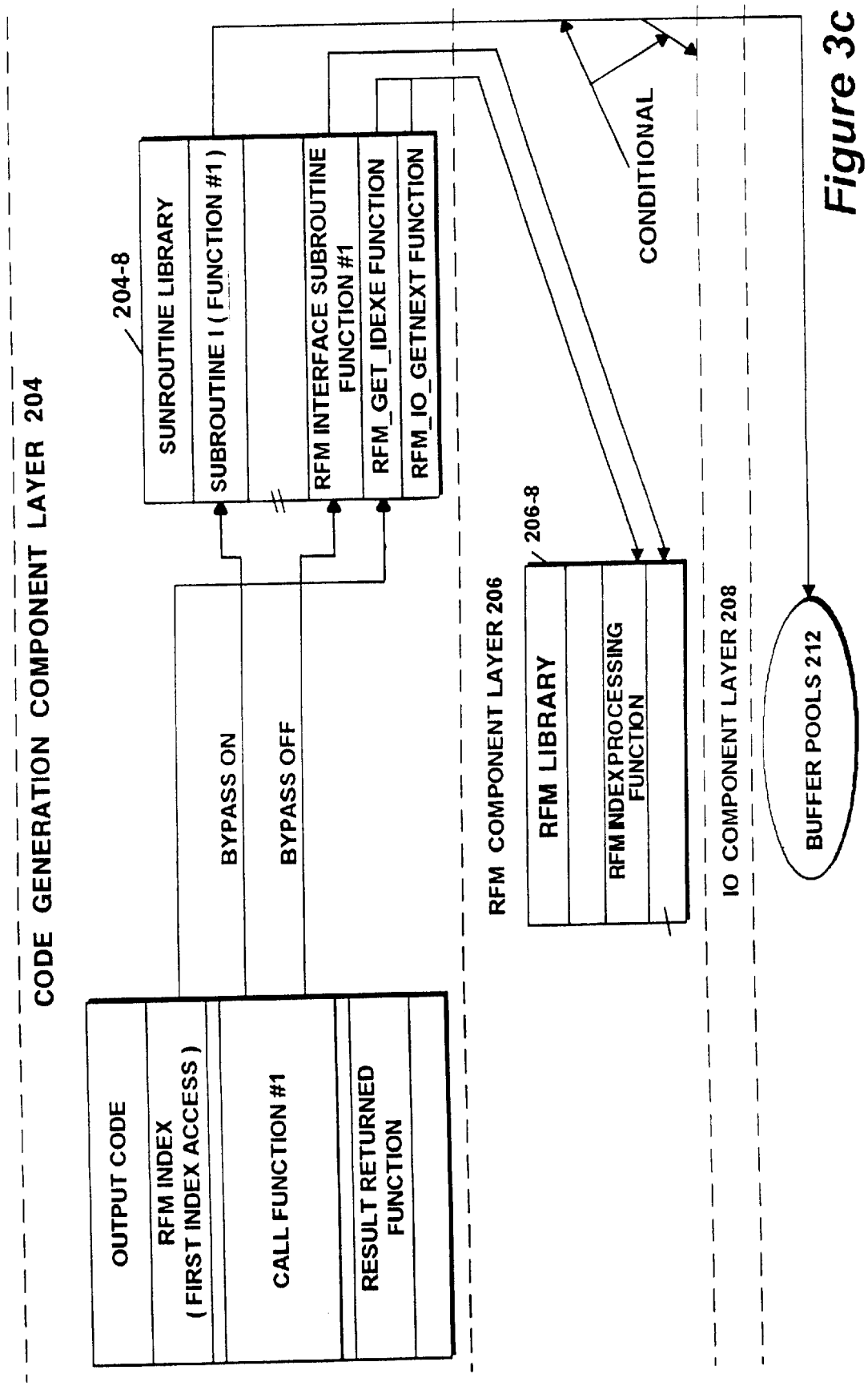

FIG. 3c illustrates conceptually, the layered organization of the present invention and more particularly, the organization of the code generation component layer 204 when having processed a particular SQL query. For example, FIG. 3cillustrates the case where layer 204 includes the index performance enhancing subroutine corresponding to subroutine IP prestored in subroutine library 204-8 for implementing certain types of index functions. Also, as indicated in FIG. 3c, library 204-8 further includes the normal RFM interface subroutine for carrying out index functions in a conventional manner by use of the lower RFM component layer 206 routines/procedures stored in RFM library 206-8 and IO component layer 208.

During the processing of an SQL query, the code generation component layer 204 operates to generate output code that includes specific call functions to the index performance enhancing subroutine IP or to the standard RFM interface subroutine. This is indicated in FIG. 3c by the pairs of dotted lines labeled "bypass" and "no bypass" between the output code block and subroutine library 204-8. When a specific operation within a query statement is determined to utilize the index performance enhancing subroutine stored in library 204-8, code generation component layer 204 includes in the output code, a call that references that performance enhancing subroutine thereby bypassing one or more lower component layers.

As indicated in FIG. 3c, the generated output code contains reference calls to subroutine IP for those parts of the SQL query that involves index searching. As discussed above, index searches can occur when processing SELECT, UPDATE or DELETE SQL statements.

Figure 4A:
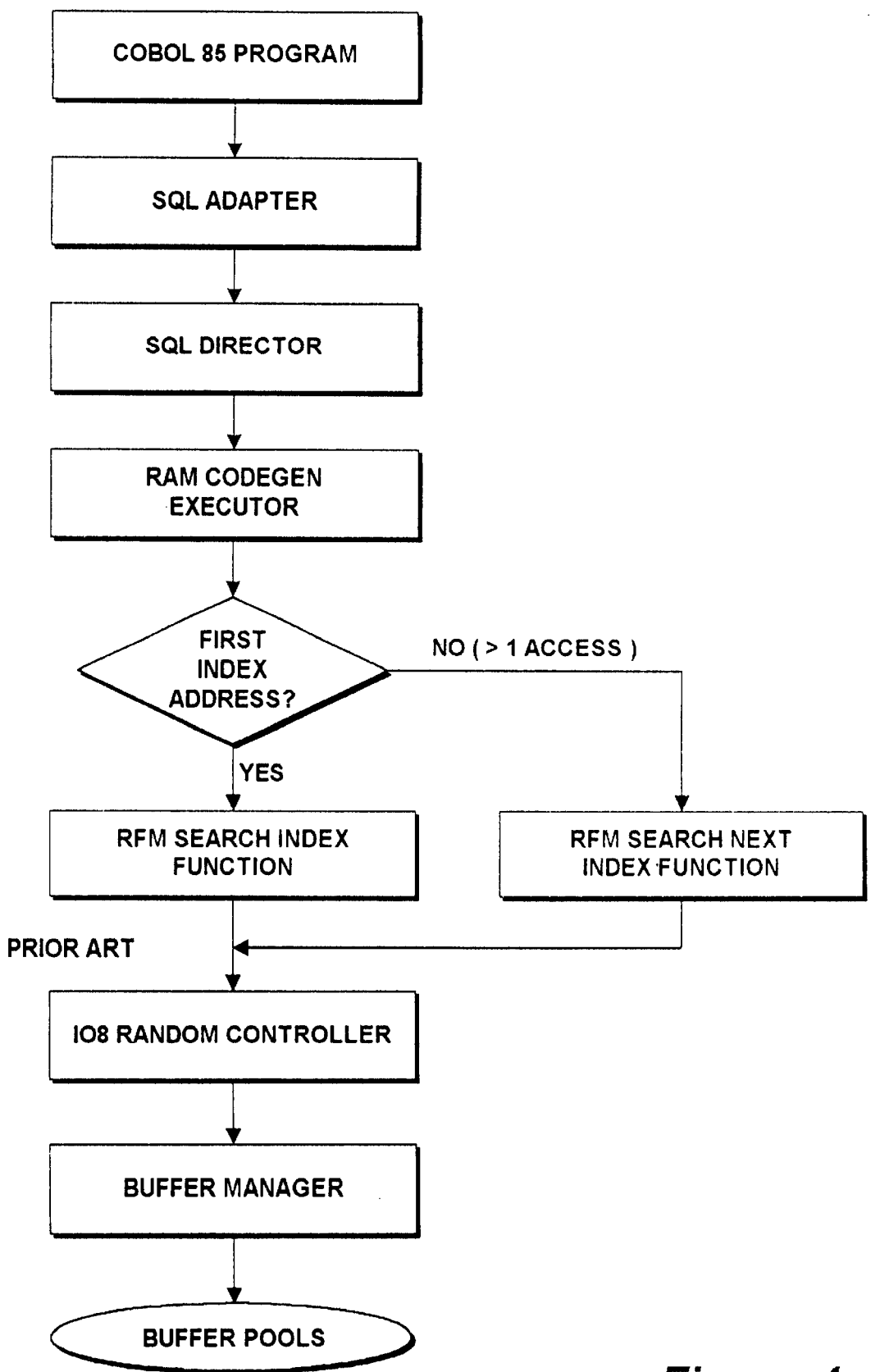
FIGS. 4a and 4b are flow diagrams used to describe the operation of the preferred embodiment of the present invention.

FIG. 4a illustrates the prior art manner in which index searches are performed. As indicated, the RFM component layer 206 performs a number of tasks when retrieving an index entry. More specifically, first, the RFM component 206 in the case of an index search or first fetch operation processes a B tree index to locate the fine level index page (CI). Such B tree indexes are created with the RFM component via the standard file open function with index attributes defined. The index fine level entries on such page are in sorted order as discussed herein.

As well known in the art, B tree structures are used by DBMS to allow users to perform queries on large databases or tables using appropriate commands, such as SQL commands. A B tree is an index residing in the database memory having one or more columns, with each column representing another dimension in the index. B trees permit searching for records in a database using one or more keys specified by users via appropriate query commands. Because the keys define a subset of an entire table or records, indexed searching can eliminate the need to search through the entire table of records in order to retrieve a much smaller subset of such records pertinent to the user query.

The present invention takes advantage of the physical layout of the fine level index entries within a fine level page (CI). The index entries are lightly packed, adjacent to one another in sorted order as indicated. Thus, if one knows the offset to a particular fine level index entry (i.e., the reference entry), its adjacent entry is found by incrementing the pointer to the reference entry by the sum of the size of the reference entry plus the DBKEY size. Therefore, when RFM component layer 206 is called to execute the First Search Next operation, it returns a pointer to the reference entry to the enhancing index subroutine I and the subroutine's index logic uses that pointer to "walk through" the fine level index CI taking entries right out from under the control of the RFM component layer 206 as the Search Next requests are made.

During operation, the RFM component layer 206 initializes the currency structure to indicate which index entry the currency processing has started with. If the RFM component layer 206 is performing a Search Next operation, it finds the currency structure in the RFM schema structure. The RFM schema structure stores information about all of the aspects of the database tables to be accessed that must remain unchanged for the execution of the execution plan strategy as well as table and file identification (i.e., names of the tables and files) that can change without making the plan strategy inoperable.

In the case of the Search Next operation, RFM component 206 checks the currency structure's status to determine whether the currency has been invalidated by an UPDATE, INSERT or DELETE operation and if it has, then it returns an error to the requestor. When valid, the RFM component 206 uses the currency structure to determine the index key value to return. It uses this information to identify the page (CI) to make a request to the IO component layer 208. When all the index keys on the fine level CI have been processed by the RFM component 206, it processes the B tree index to determine what CI holds the next fine level key page. If the index entry specifies that it is one of many (duplicate keys), then the duplicate key processing functions of the RFM component layer 206 are invoked.

After the index entry has been chosen, the RFM component 206 updates the currency structure to indicate that the next entry was taken. Finally, the RFM component 206 copies the index entry into the user's buffer and returns.

Figure 4B:
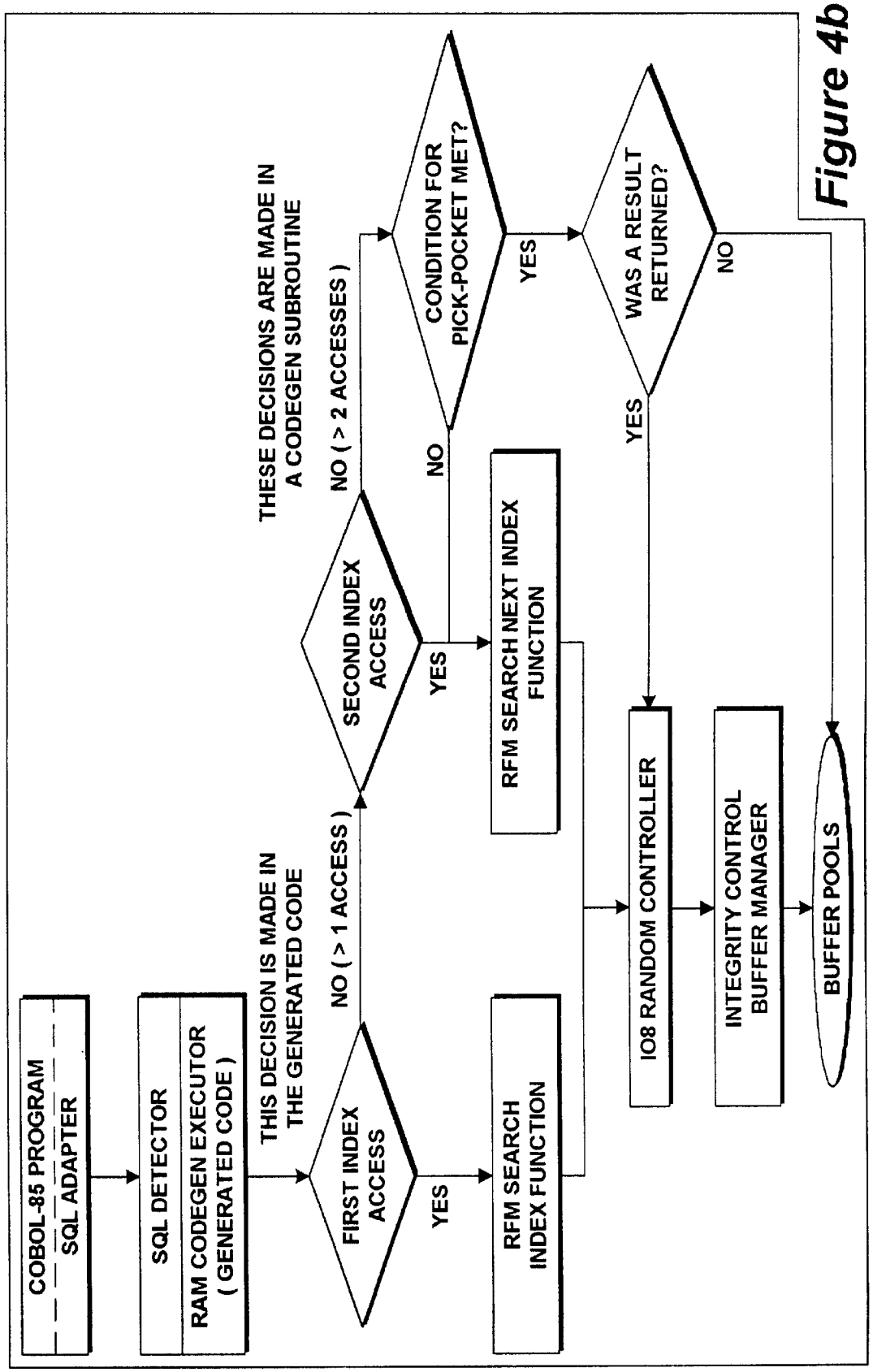

FIG. 4b—Invention Index Processing Flow

FIG. 4b illustrates the enhanced index processing and more specifically, the manner in which index scan operations are executed according to the teachings of the present invention. As indicated in FIG. 4b, the standard index processing is performed by the code generation layer 204 in conjunction with RFM layer 206 in the manner described.

As indicated in FIG. 4b, the search process is altered to improve index access Search Next performance. The output code calls the index enhancing performance subroutine IP to determine if more than two next index accesses have been processed. On the second Search Next request, the subroutine IP examines the fine level index CI from which the prior index entry was retrieved. If the currency has not changed and the index CI has not changed and if the currency points to a fine level index entry that does not have duplicates, then the subroutine IP copies the requestor's key buffer along with the database key (DBKEY). The subroutine IP updates the currency information to point to the next fine level index entry. Finally, the subroutine IP returns to the caller.

In greater detail, the key aspect of the present invention is for the code generation component layer 204 to have the RFM component layer 206 fetch the first entry as normal so that the fine level index CI is read into the buffer pool and all the currency information will be established. On the first Search Next call, RFM component layer 206 will return a pointer to the index CI and the currency control structure. For the subsequent Search Next calls, the code generation component layer 204 will use the returned pointer and the currency information to obtain the next key.

As indicated in FIG. 4b, if the code generation component layer 204 processes a result following an index access, it calls the IO component layer 208 to refresh the index fine level CI pointer. From the DBKEY stored in the currency control information (idx_tb1 structure), code generation component layer 204 determines the CI that is required. The code generation component layer 204 will update the currency information each time it retrieves from the CI, a key that is not a duplicate. The code generation component layer 204 always tests the currency status. When the currency is obliterated or the CI changes, code generation component layer 204 calls the RFM component layer 206 to handle the request and setup the error status.

When the end of a fine level CI is met, the code generation component layer 204 calls the RFM component layer 206 to do the next Search Next operation so that RFM component layer 206 handles the B tree search for the next CI. When a duplicate is found, the code generation component layer 204 calls the RFM component layer 206 to do the Search Next operation and handle the duplicate processing.

For a more complete understanding of the benefits of the present invention, the following example of a query and its DDL will now be considered:

select firstName, ssNumber from student where lastName='Jones' and middleinitial='A'; (and this select is associated with a CURSOR, hence many results may be obtained)

create table student
(lastName char(20), firstName char(20), middleinitial char(1), ssNumber numeric(12));

create index ixStudent on student (lastName, firstName, middleinitial;

And assume that the table includes the following data:

| lastName | firstName | middleInitial | ssNumber |
| --- | --- | --- | --- |
| James | Richard | H | 512-66-1234 |
| Jones | Anne | W | 512-55-1324 |
| Jones | Don | H | 512-44-1432 |
| Jones | Joseph | A | 512-33-2134 |
| Jones | William | E | 512-22-5566 |
| Justice | Don | T | 512-114144 |

The index would be a subset of this data, in sorted order (the six rows in this example are sorted).

The processing of the above data involves the following steps:

The RAM Optimizer 204-2 of FIG. 3a processes the query at execution time. The Optimizer 204-2 determines that index access via index ixStudent will provide the most efficient access to the data and generates the set of EDOT structures to define the access method, the operation and the columns to be returned. The type of structures generated are illustrated in an appendix.

Next, code generation component layer 204 is called to generate output code to process the query in accordance with the set of EDOT structures specified by the RAM Optimizer 204-2. Its tasks include the generation of output code to call its subroutine library functions RFM_GET_INDEXE and RFM_IO8_GETNEXT illustrated in FIG. 3c as well as generating output code to evaluate the index entries returned by these functions. The type of output code generated is illustrated in an appendix.

Next, the generated output code is executed. The output code begins index access with a call to its subroutine library function RFM_GET_INDEXE to find the first index entry beginning with 'Jones'. This function calls RFM component layer 206 that will search the B tree index until 'Jones' is found. This could involve repeated IO component layer calls as the index tree is analyzed to support the search for the fine level index CI that contains the first instance of 'Jones'.

Once the fine level index entry for 'Jones' is found, the RFM component layer 206 returns the index to the generated output code's key buffer for further analysis by the output code. Next, RFM component layer 206 returns to the subroutine library 204-8 function that will return to the generated output code. The generated output code next verifies that 'Jones' was returned and then tests for 'A' in the middle initial column of the index entry. Because the first instance of 'Jones' does not have 'A' as a middle initial, the search continues (assuming that another 'Jones' exists).

Next, the generated output code calls its subroutine function RFM_IO8_GETNEXT to retrieve the next index entry for 'Jones'. Since the subroutine function RFM_IO8_GETNEXT does not have a pointer to the RFM currency information that is required to "pickpocket" the fine level index CI, it calls the RFM's Search Next function. This function retrieves its currency information and calls the IO component layer 208 for a pointer to the fine level index CI. If the requested CI is in a buffer, IO component layer 208 returns the pointer to the RFM component layer 206. If it is not in a buffer, then IO component layer 208 calls buffer manager 210 of FIG. 2.

The IO component layer 208 returns with a pointer to the fine level index CI that has been read into the buffer pool. RFM component layer 206 finds the next entry and sets up its currency information. It returns to the subroutine function RFM_IO8_GETNEXT with a pointer to the CI and a pointer to its currency information. The function RFM_IO8_GETNEXT then returns to the generated output code that analyzes the returned index key value. Because the second instance of 'Jones' does not have 'A' as a middle initial, the search continues. The generated output code again calls the subroutine function RFM_IO8_GETNEXT to retrieve the next index entry for 'Jones'. Subroutine RFM_IO8_GETNEXT notes that it has all the necessary pointers to find the next fine level index entry in the index CI. Because the prior search did not produce a result, the generated output code did not set the result processed indicator. Therefore, the function RFM_IO8_GETNEXT uses its CI pointer and the RFM currency information to copy the next fine level index entry from the buffer pool to the generated output code key buffer.

The RFM_IO8_GETNEXT subroutine function increments the RFM currency information, setting it to identify the next index entry to be processed. Then, the RFM_IO8_GETNEXT subroutine returns to the generated output code which analyzes the returned index key value. Because the second instance of 'Jones' does have 'A' as a middle initial, the output code performs a data file fetch sequence to retrieve the index's associated data file using the DBKEY associated with the index as its row identifier. Because this is an acquisition of a result, the output code sets the result processed indicator which means that the next index search will require a call to the IO component layer 208 at a minimum to refresh its pointer to the fine level index CI.

After the result is returned to the caller, the caller might request another FETCH from the open cursor and hence call to see if a second 'Jones' entry with middle initial 'A' exists. If so, the output code calls the subroutine RFM_IO8_GETNEXT. The RFM_IO8_GETNEXT subroutine will note that all the information required to "pickpocket" exists but the results processed indicator is set. Therefore, the subroutine will find the DBKEY for the last fine level index CI fetched from the currency information structure and from this calculate the CI to request from the IO component layer 208. The IO component layer 208 is called to locate the CI. Once identified, the IO component layer 208 will return with a pointer to the CI.

The RFM_IO8_GETNEXT subroutine uses the CI pointer and the RFM currency information to retrieve the next fine level index entry and copy it to the generated output code key buffer. The RFM_IO8_GETNEXT subroutine then increments the RFM currency information, setting it to identify the next index entry to be processed. The RFM_IO8_GETNEXT subroutine then returns to the generated output code which analyzes the returned index key value. Because the fourth instance of 'Jones' does not have an 'A' middle initial, the search continues.

The generated output code again calls the RFM_IO8_GETNEXT subroutine to retrieve the next index entry for 'Jones'. The subroutine function RFM_$_{IO8}$_GETNEXT notes that it has all the necessary pointers to find the next fine level index entry in the index CI. Because the prior search did not produce a result, the generated output code does not set the result processed indicator. Therefore, subroutine RFM_IO8_GETNEXT uses its CI pointer and the REM currency information to retrieve the next fine level index entry and copy it to the generated output code key buffer. Again, the RFM_IO8_GETNEXT subroutine increments the RFM currency information, setting it to identify the next index entry to be processed.

The RFM_IO8_GETNEXT subroutine then returns to the generated output code which analyzes the return index key value. Because the lastName returned is greater than 'Jones', the generated output code returns the end of set status and processing is complete.

The above example illustrates how the present invention bypasses the RFM and IO component layers resulting in a significant reduction in index search time. The Appendices illustrate examples of output code utilized in the preferred embodiment of the present invention. For example, snippets of the specific code used in generating the call to the index enhancing subroutine are included in the appendices.

While the present invention was described relative to processing SQL statements, it will be obvious to those skilled in the art that the present invention may be used in conjunction with any database oriented systems that seeks to make significant performance gains. This could include all database types including relational database systems as well as "home brew" flat file databases that are used by many application developers. Also, while the preferred embodiment of the present invention operates to invoke the enhanced index processing of the present invention on the second search next index operation, it will be appreciated that as a matter of design choice such processing could occur on the first search next index operation. In the preferred embodiment, it was found that it was simpler to modify the RFM search next logic to capture the required pointers rather than to modify the RFM search index logic to capture the required pointers.

Appendicies

I. Glossary
II. Example EDOT output
III. Structure Chart for Code Generation Component Layer Functionality that Generates Code for a Cursor Open (SELECT) Operation
IV. Example of Generated Output Code to Call the Index Processing Subroutine I
V. Code Snippets utilized by the Code Generation Component for Generating the Call to Retrieve the Next Index Entry
VI. Significant Code from the rfm_io8_getNext Subroutine

APPENDIX I

| Glossary | |
| --- | --- |
| • access method | The way in which the RDBMS accesses relational data, using hash, indexed, or scan access. |
| * access plan- | The RDBMS Optimizer's plan for executing an SQL statement, including the type of access to each table, |

APPENDIX I-continued

Glossary

| | |
|---|---|
| • administrator- | order of access, whether any sorts or joins are performed, and related information.<br>An individual who carries out tasks such as creating databases and/or monitoring the use and performance of those databases. |
| • application- | A program or set of programs that performs a specific task, such as entering orders and updating inventory records. |
| • application programmer (application developer)- | An individual who participates in the design, implementation, and/or testing of applications, including end-user facilities. |
| • attribute- | A descriptive characteristic of an entity, such as name, order number, item quantity, and so on. A characteristic such as UNIQUE or NOT NULL that can be applied to a column or other entity. |
| • B Tree | An index residing in the database memory and database memory and having one or more columns, with each column representing another dimension in the index. |
| • Buffer Manager- | The software that manages buffer pools. |
| • buffer pool- | Main memory that is reserved for the buffering requirements of one or more tablespaces, tables, or indexes. |
| • Central SQL Cache- | Configured memory space in which code segments generated by the RDBMS are stored for reuse if the same SQL statement is executed again by any process that has been associated with this same Central SQL Cache. The use of one or more Central SQL Caches is optional and under Administrator control. |
| • CHARACTER data type- | An RDBMS data type defined as fixed-length character. |
| • code generation- | The RDBMS process that generates executable code for a specific SQL statement instead of executing that statement interpretively. |
| • code segment- | The code generated by the RDBMS for a specific SQL statement. Each code segment is stored in the Cache for reuse if the same SQL statement is executed again by the same process in the case of Process-Local SQL Cache, or by another process in the case of Central Cache. |
| • code_token (node) | An item that uniquely refers to a segment of generated code. |
| • column- | The vertical component of a table. A column contains information about one of the attributes of an entity. The relational equivalent of a field. |
| • concurrency control- | The management of file accesses by processes operating concurrently, with the goal of ensuring that no process interferes with any other process and that the integrity of the data accessed in common is maintained. |
| • concurrency level- | The number of processes that concurrently access the same data. |
| • concurrent access- | Two or more processes accessing the same data table or partition at the same time. |
| • Control Interval (CI)- | The physical space increment used to store data in RDBMS files, processed as a unit. Synonymous with page. In a hash table, a CI is called a hash bucket. |
| • currency | An index currency is the information required to uniquely identify a location within a B Tree index. The information stored in an index currency includes the CI and key entry number within the CI for each level of the B Tree. If the key entry is a duplicate, the index currency also stores the duplicate entry number. This information allows RFM to retrace the path down to the particular key entry that is current. This also allows RFM to advance to the next logical key entry in the B Tree index. |
| • data type- | A definition of how the data in a column is stored and managed. Commonly used data types include CHARACTER, NUMERIC, and FLOAT. |
| • database- | A collection of data that has meaning to an organization or to an individual and that is managed as a unit. |
| • database key (DBK) | A database key is a key that consists of the CI number and line array for a row. When a row is |

APPENDIX I-continued

Glossary

| | |
|---|---|
| | inserted into a table in an INTEREL/RFM database, the RFM component assigns a DBKEY to the row's index entry. This DBKEY is appended to the index entry so that when the entry is found later by a search, the DBKEY is then used to locate the data row. |
| • Database Management System (DBMS)- | A set of software that controls the creation, organization, and modification of one or more databases, and provides access to the stored data. |
| • Data Definition Language (DDL)- | Statements used to define the entities, attributes, and relationships that make up a database. DDL statements in RDBMS include CREATE MODEL, CREATE TABLE, CREATE INDEX, and others. |
| • Data Manipulation Language (DML)- | Statements used to access data and potentially to change data content. DML statements in RDBMS include SELECT and UPDATE. |
| • DATE data type- | A special-purpose RDBMS data type used to store a four-byte date that can be used in comparisons or computations. The date is formatted in packed decimal in the row in storage, and expanded when read into application memory. |
| • DECIMAL data type- | An RDBMS data type defined as fixed-length with decimal content. |
| • EDOT | A set of structures resulting from the processing of a query by an optimizer. The term EDOT pertains to the identification (name) of the file code where these structures were once stored (i.e. the E.file code file). |
| • fine level index | Equivalent to leaf page. The leaf level page(s) of a B Tree index. The level where the index entries reside. |
| • FROM clause- | The part of an SQL statement that specifies the table(s) from which data is to be accessed. |
| • generated code- | A reusable set of machine instructions that are produced to execute a particular SQL statement. |
| • gen_time (node) | The approximate time that was required to generate the associated segment of code. |
| • host variable- | Storage allocated by a language processor such as COBOL-85 for use in passing variable information to or from an SQL statement. |
| • host-relational files- | Files managed by RAM/RFM and maintained mass-storage devices attached to a system. The term is used to distinguish these files from relational files maintained by a Relational Data Base Computer linked to a system. |
| • IO_XPT | This structure is the parameter passed on every call to the IO Component Layer. When performing a SELECT or FETCH, the file identifier and CI number are passed in this structure. The results of IO Component Layer operations are returned in this structure. |
| • index- | A set of pointers to data in relational tables, used to improve the speed of access to the data. The index is maintained in the form of a balanced B-tree structure. |
| • index key- | The column(s) whose values are included in the index for the table. |
| • indexed access- | The access mode in which RDBMS uses one or more indexes to retrieve the requested information. In some cases, RDBMS can retrieve the requested information directly from the index, without accessing the data table. |
| • indicator variable- | An indicator used to notify the application that an exception condition, such as an overflow or truncation error, occurred. When used to indicate the presence of the null value, the indicator is referred to as a null indicator variable. |
| • indicator column- | A technique in denormalization in which an indicator column in one table indicates whether an access to a second table is required. Using an indicator column introduces the risk that data anomalies will occur. |
| • INTEGER data type- | An RDBMS data type used to store binary values. |
| • integrity- | The property of being logically correct and consistent. In some cases, this term also implies denying access to unauthorized users and processes. |
| • null value- | A value designed to be used when the actual value is unknown or inappropriate. For example, using the null value for a price that has not yet been defined |

APPENDIX I-continued

Glossary

| | |
|---|---|
| | avoids the ambiguity of using a zero value in this case. |
| • null indicator variable- | An indicator used to notify the application that a column contains the null value. |
| • NUMERIC data type- | An RDBMS data type defined as fixed-length and limited to the numerals 0–9. |
| • Operational Directory Interface (ODI)- | A data definition directory used by RDBMS. |
| • Optimizer- | The software component of RDBMS that analyzes each SQL statement and defines the access plan that will produce the optimum performance for the execution of that statement. |
| • page- | The physical space increment used to store data in RDBMS files, processed as a unit. Synonymous with control interval (CI). |
| • partitioned row | A row that was originally inserted into a database page and was subsequently updated so that the row exists in more than a single page or CI. |
| • partitioned tablespace- | A tablespace that contains a single table that is too large to process efficiently as one entity. The tablespace and the table are separated into partitions that can be placed on different mass storage devices. Each partition can be processed independently. |
| • performance- | The ability of applications and interactive facilities to meet users' requirements for speed of response in interactive applications or speed of throughput in production batch and/or transaction processing applications. |
| • primary index (key)- | In some implementations, but not in RDBMS, an index (and associated key) that uniquely identifies each row of a table. |
| • process- | An execution unit, which may or may not be identical to an application program. (An application program may involve multiple processes.) |
| • Process-Local SQL Cache- | The configured memory space in which code segments generated by RDBMS are stored for reuse if the same SQL statement is executed again by the same process. |
| • query- | Used to refer to any SQL statement that causes an access to relational tables, regardless of whether the access is followed by a modification. |
| • read-ahead feature- | The Buffer Manager's operational mode in which up to 16 pages are read into the buffer pool at one time, so that the data will be available when needed. The read-ahead feature is used in scan access mode. |
| • recovery- | The process of restoring database(s) and/or application(s) to a known state after an exception condition or a process or system failure. |
| • Relational Access Manager (RAM)- | The part of the RDBMS software that manages relational tables. |
| • Relational database- | A database that is defined in terms of entities, attributes, and relationships, and that observes the concepts defined originally by E.F. Codd. |
| • Relational Database Management System (RDBMS)- | The INTEREL Software that manages relational databases. |
| • Relational File Manager (RFM)- | The part of the RDBMS software that accesses data from relational files, as directed by the Relational Access Manager (RAM). |
| • RFM_XPT | The RFM_XPT structure is the parameter that must be passed on all calls to RFM functions. It facilitates the passing of variable information to the RFM component layer regarding the operation to be performed in a subset of the structure named the V block. It also facilitates the return of information such as the DBKEY and status in another subset of the structure named the R block. When generated code's subroutines call the RFM component layer to retrieve a row, the subroutines pass the DBKEY, file identifier and description of what columns to fetch and where to store them (that is, a pointer to the generated code's data buffer) in the RFM_XPT structure. The subroutines also examine the RFM_XPT's R block after the call to determine the status of the request. |
| • relationship- | An association of one or more entity types with one or more other entity types. |
| • row- | The horizontal component of a table. A row consists |

APPENDIX I-continued

Glossary

| | |
|---|---|
| | of a sequence of values, one for each column of the table. |
| • scan access- | The access mode in which RDBMS scans a table sequentially, row-by-row, to retrieve the requested information. |
| • schema structure | It is used by the RFM and is the root of the RFM logical definition of a related group of files, all of the information that the RFM uses to access a physical file is in some way related in this structure. |
| • search condition- | The specification of how to identify the desired data in the rows and columns retrieved when processing an SQL statement. |
| • secondary index- | In some RDMBS implementations, any index that is not a primary index. In RDBMS, most indexes are treated as secondary indexes; cluster indexes and system-generated indexes created because a column is defined with the UNIQUE attribute are the exceptions to this rule. RDBMS enforces the uniqueness of the columns included in these indexes. |
| • SELECT- | An SQL statement that defines the information to be selected from one or more tables. Also, a clause that includes the SELECT verb in an SQL statement. |
| • single-column index (key)- | An index and key made up of only one column. |
| • single-table tablespace- | An unpartitioned tablespace that contains one table. The tablespace is a single physical file. Contrast this with multi-table tablespace and with partitioned tablespace. |
| • SMALLINT data type- | An RDBMS data type used to store binary values, using less space than is required for the INTEGER data type. |
| • SQL- | Originally an acronym for Structured Query Language. Now the name of the language most commonly used to access relational databases. |
| • SQL Cache- | Configured memory space in which code segments generated by RDBMS are stored for reuse if the same SQL statement is executed again. There are two levels of SQL Cache, Process-Local SQL Cache and Central SQL Cache. |
| • SQLCA | The SQL Communications Area (SQLCA) is a fixed-length data structure which allows the application program to provide the specific database options and information to the database content manager. It also allows the application program to interrogate the execution results of an embedded SQL statement. |
| • SQLDA | The SQL Descriptor Area (SQLDA) is a variable length data structure what when used in an OPEN or FETCH statement, it provides the information about the host variables to INTEREL software. |
| • table- | The relational component that corresponds to a file in non-relational technology. Tables have two forms: hash and non-hash. |
| • tablespace- | Physical space that is created explicitly to contain one or more tables in a relational database. If a tablespace is not created explicitly, the table is stored in space allocated by the system. Space allocated by the system is not called a tablespace. |
| • TIME data type- | A special-purpose RDBMS data type used to store a three-byte time that can be used in comparisons or computations. The time is formatted as packed decimal in the row in storage, and expanded when read into application memory. |
| • TIMESTAMP data type- | A special-purpose RDBMS data type used to store a 10-byte time stamp that can be used in comparisons or computations. The timestamp is formatted as packed decimal in the row in storage, and expanded when read into application memory. |
| • Transaction Processing Routine (TPR)- | An application program that processes transactions under control of a transaction monitor. In the context of this publication, the transaction monitor is TP8. |
| • tuning- | The process of adjusting database definitions, application implementations, and/or system parameters to improve performance. |
| • UNIQUE key- | An index key or a hash key made up of one or more columns in which no duplicate values are allowed. |
| • unpartitioned tablespace- | A tablespace that contains either a single table or multiple tables. The latter case is called a multi-table |

APPENDIX I-continued

Glossary

| | |
|---|---|
| | tablespace. In both cases, the tablespace is a single physical file. Contrast this with partitioned tablespace. |
| • user- | An individual who accesses RDBMS databases by means of an application or interactive facility. |
| • VARCHAR data type- | An RDBMS data type defined as variable-length character. |
| • WHERE clause- | The part of an SQL statement that defines the conditions (restrictions) for selecting data before grouping (if grouping is specified). These restrictions are referred to as search conditions. |

APPENDIX II

1. Optimizer Output-EDOT Example:

For the query:
    select firstName, ssNumber from student
        where lastName = 'Jones' and middleInitial = 'A';
the RAM Optimizer produces the following EDOT:

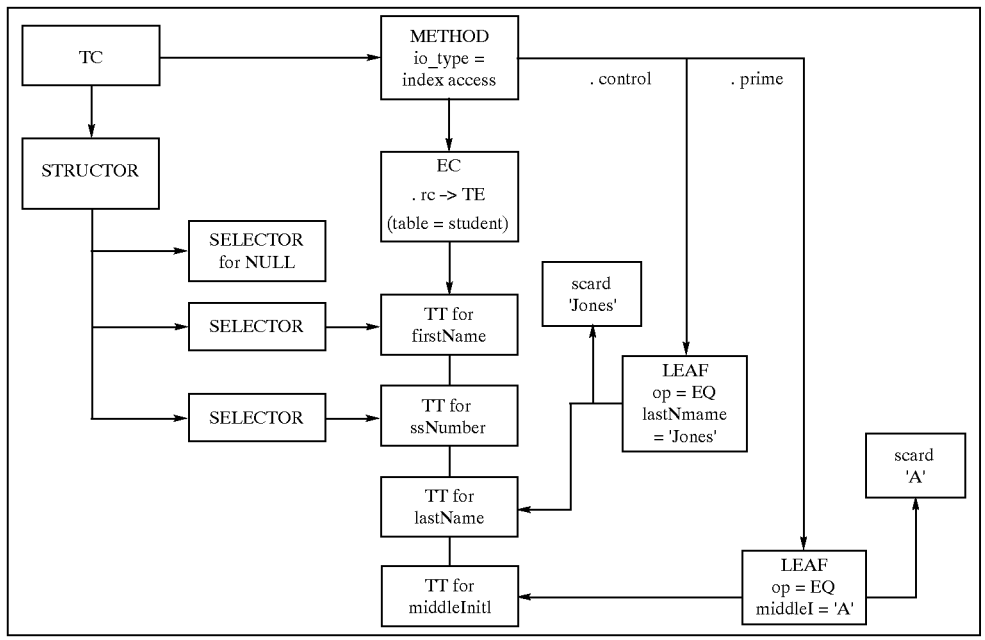

```
TC <- - - - - - - - - - - - - - - - - - - - - - -145322006112
    TYPE =                        1
    NON_AGGR_PRESENT =            YES
    DUPLICATE_GROUP_ITEMS =       0
    SELECT$ =                     145576006112
    EC =                          145374006112
    METHOD =                      150070006112
    RESTRICT =                    147752006112
    AGGR_COUNT =                  0
    GROUP_SIZE =                  0
    LEAF_COUNT =                  3
    LEAF_BASE =                   145714006112
    VR_SIZE =                     8912896
    VIRTUAL_REC =                 000000006000
    PARAMETER =                   000000006000
*** BEGIN TC.SELECT$ ***
```

-continued

```
STRUCT <------------------ 145576006112

Offset from TC =              000000000254
    TYPE =                        3
    MAX_SIZE =                    0
    COUNT =                       2
    SEL =                         145610006112
    SEL =                         145420006112
    SEL =                         145535006112
TT <---------------------- 145610006112

Offset from TC =              000000000266
    TYPE =                        5
    MODE =                        000000000
    TWA_DATA_TYPE =               000000
    STAR_NULL =                   YES
    TWA_EIS =                     000000000000000000000000000000000000
    RWA_EIS =                     000000000000000000000000000000000000
    START_ELEMENT =               000
    END_ELEMENT =                 000
    LENGTH =                      1
    SCALE =                       2
    OBJECT =                      000000006000
    ECTT =                        145432006112
    EC =                          145374006112
    FR =                          000000006000
    AL =                          000000006000
SELECTOR <---------------- 145420006112

Offset from TC =              000000000076
    TYPE =                        4
    AL_FOR_TT_LIST =              000000000000
    OBJECT =                      145432006112
    LENGTH =                      9
    NAME =                        FIRSTNAME
SELECTOR <---------------- 145536006112

Offset from TC =              000000000214
    TYPE =                        4
    AL_FOR_TT_LIST =              000000000000
    OBJECT =                      145546006112
    LENGTH =                      8
    NAME =                        SSNUMBER
*** BEGIN TC.EC ***
EC <---------------------- 145374006112

Offset from TC =              000000000052
    TYPE =                        2
    SELECTED =                    YES
    TT =                          145774006112
    TCEC =                        000000006000
    TC =                          145322006112
    RC =                          535723006112
    IA_PTR =                      402702006112
    SDOT_ID =                     000000000001100001000000000100011001
                                  000011000110000011000100011101101011
    CALC_COUNT =                  0
    BUFF_SIZE =                   0
    BUFF =                        402504006112
    FILE_TYPE =                   5
    VOLUME =                      100
    DBKEY =                       0
    AREA_ID_OFFSET =              0
    AL =                          000000006000
TT <---------------------- 145774006112

Offset from TC =              000000000452
    TYPE =                        5
    MODE =                        001000000
    TWA_DATA_TYPE =               000000
    INDEX_ACC =                   YES
    RESTRICT =                    YES
    NULL_ALLOWED =                YES
    TWA_EIS =                     011000000000000000000000000000000001
    RWA_EIS =                     001000000000000000000000000000000001
    START_ELEMENT =               000
    END_ELEMENT =                 000
    LENGTH =                      1
    SCALE =                       0
```

-continued

| | |
|---|---|
| OBJECT = | 000000006000 |
| ECTT = | 145666006112 |
| EC = | 145374006112 |
| FR = | 536023006112 |
| AL = | 000000006000 |
| TT <- - - - - - - - - - - - - - - - - - - - - - | 145666006112 |
| Offset from TC = | 000000000344 |
| TYPE = | 5 |
| MODE = | 001000000 |
| TWA_DATA_TYPE = | 000000 |
| INDEX_ACC = | YES |
| RESTRICT = | YES |
| NULL_ALLOWED = | YES |
| TWA_EIS = | 0110000000000000000000000000000010100 |
| RWA_EIS = | 0010000000000000000000000000000010100 |
| START_ELEMENT = | 000 |
| END_ELEMENT = | 000 |
| LENGTH = | 20 |
| SCALE = | 0 |
| OBJECT = | 000000006000 |
| ECTT = | 145610006112 |
| EC = | 145374006112 |
| FR = | 535767006112 |
| AL = | 000000006000 |
| TT <- - - - - - - - - - - - - - - - - - - - - - | 145610006112 |
| Offset from TC = | 000000000266 |
| TYPE = | 5 |
| MODE = | 000000000 |
| TWA_DATA_TYPE = | 000000 |
| STAR_NULL = | YES |
| TWA_EIS = | 0000000000000000000000000000000000000 |
| RWA_EIS = | 0000000000000000000000000000000000000 |
| START_ELEMENT = | 000 |
| END_ELEMENT = | 000 |
| LENGTH = | 1 |
| SCALE = | 2 |
| OBJECT = | 000000006000 |
| ECTT = | 145432006112 |
| EC = | 145374006112 |
| FR = | 000000006000 |
| AL = | 000000006000 |
| TT <- - - - - - - - - - - - - - - - - - - - - - | 145432006112 |
| Offset from TC = | 000000000110 |
| TYPE = | 5 |
| MODE = | 001000000 |
| TWA_DATA_TYPE = | 000000 |
| INDEX_ACC = | YES |
| NULL_ALLOWED = | YES |
| TWA_EIS = | 0110000000000000000000000000000010100 |
| RWA_EIS = | 0010000000000000000000000000000010100 |
| START_ELEMENT = | 000 |
| END_ELEMENT = | 000 |
| LENGTH = | 20 |
| SCALE = | 0 |
| OBJECT = | 000000006000 |
| ECTT = | 145546006112 |
| EC = | 145374006112 |
| FR = | 536005006112 |
| AL = | 000000006000 |
| TT <- - - - - - - - - - - - - - - - - - - - - - | 145546006112 |
| Offset from TC = | 000000000224 |
| TYPE = | 5 |
| MODE = | 010100000 |
| TWA_DATA_TYPE = | 000101 |
| NULL_ALLOWED = | YES |
| TWA_EIS = | 0110000000000000000101000000000001101 |
| RWA_EIS = | 0010000000000000000001000000000001101 |
| START_ELEMENT = | 000 |
| END_ELEMENT = | 000 |
| LENGTH = | 13 |
| SCALE = | 0 |
| OBJECT = | 000000006000 |
| ECTT = | 150174006112 |
| EC = | 145374006112 |

-continued

```
       FR =                          536041006112
       AL =                          000000006000
TT <---------------------- 150174006112
-
       Offset from TC =              000000002652
       TYPE =                        5
       MODE =                        001000000
       TWA_DATA_TYPE =               000000
       INDEX_ACC =                   YES
       MULTI_FIELD_KEY =             YES
       FOR_RFM_KEY_FIELD =           YES
       TWA_EIS =                     001000000000000000000000000000101001
       RWA_EIS =                     001000000000000000000010000000101001
       START_ELEMENT =               000
       END_ELEMENT =                 000
       LENGTH =                      41
       SCALE =                       0
       OBJECT =                      000000006000
       ECTT =                        000000006000
       EC =                          145374006112
       FR =                          536065006112
       AL =                          000000006000
FE <---------------------- 536057006112
-
       TYPE =                        6
       FILE_TYPE =                   1
       DATA_RAP_NUM =                1249
       INDX_RAP_NUM =                0
       OCCUPIED_PAGES =              7
       LOAD_MODE =                   YES
       PCTFREE =                     25
       PCTGROW =                     50
       PCTTHRESHOLD =                20
       CISIZE =                      512
TE <---------------------- 535723006112
-
       TYPE =                        2
       TOTAL_SIZE =                  138
       CREATE_USERID =               DSEDWARDS
       NUMBER =                      583
       DATA_RAP =                    1249
       FD_COUNT =                    4
       KE_COUNT =                    1
       ROW_SIZE =                    54
       KEY_SIZE =                    41
       PAGE_COUNT =                  0
       NAME =                        STUDENT
       ATTACHED =                    YES
       WRITE_ALLOC =                 YES
       FILE_ALLOCATED =              YES
       RFM_OPENED =                  YES
       HASH_ERA_TE =                 YES
       CI_SIZE =                     0
       LINES_PER_CI =                32
       LOAD_LIMIT =                  0
       SPACE_CTL =                   0
       SCHEMA_PTR =                  000000006000
       DATA_FC =                     A+
       INDX_FC =                     B+
       NEXT_TE =                     000000006000
       FD_PTR =                      535767006112
       KE_PTR =                      536065006112
       DATA_FE =                     536057006112
       INDX_FE =                     536105006112
       MEM_BLOCK_PTR =               000000006000
       MODEL_PTR =                   476734006112
       RECORD_COUNT =                100
       STATS_ENTRY_NO =              −1
       DATA_ROW_SIZE =               48
       TS_PTR =                      000000006000
       CI_SIZE_RAMINDEX =            512
       CI_SIZE_CLUSTER =             0
FE <---------------------- 536105006112
-
       TYPE =                        6
       FILE_TYPE =                   2
       DATA_RAP_NUM =                1249
       INDX_RAP_NUM =                1250
       OCCUPIED_PAGES =              0
```

-continued

```
        LOAD_MODE =              YES
        PCTFREE =                25
        PCTGROW =                50
        PCTTHRESHOLD =           20
        CISIZE =                 512
FD <- - - - - - - - - - - - - - - - - - - - - - - 535767006112
-
        TYPE =                   3
        LENGTH =                 20
        NAME =                   LASTNAME
        IN_USE_FOR_COMM =        YES
        PRESENT_IN_ROW =         YES
        DATA_TYPE =              3
        NULL_TYPE =              0
        OFFSET =                 0
        NUMBER =                 1
        NEXT_FD =                536005006112
        KD_PTR =                 536113006112
        HASH_KD_PTR =            000000006000
FD <- - - - - - - - - - - - - - - - - - - - - - - 536005006112
-
        TYPE =                   3
        LENGTH =                 20
        NAME =                   FIRSTNAME
        IN_USE_FOR_COMM =        YES
        PRESENT_IN_ROW =         YES
        DATA_TYPE =              3
        NULL_TYPE =              0
        OFFSET =                 20
        NUMBER =                 2
        NEXT_FD =                536023006112
        KD_PTR =                 536123006112
        HASH_KD_PTR =            000000006000
FD <- - - - - - - - - - - - - - - - - - - - - - - 536023006112
-
        TYPE =                   3
        LENGTH =                 1
        NAME =                   MIDDLEINITIAL
        IN_USE_FOR_COMM =        YES
        PRESENT_IN_ROW =         YES
        DATA_TYPE =              3
        NULL_TYPE =              0
        OFFSET =                 40
        NUMBER =                 3
        NEXT_FD =                536041006112
        KD_PTR =                 536133006112
        HASH_KD_PTR =            000000006000
FD <- - - - - - - - - - - - - - - - - - - - - - - 536041006112
-
        TYPE =                   3
        LENGTH =                 7
        NAME =                   SSNUMBER
        IN_USE_FOR_COMM =        YES
        PRESENT_IN_ROW =         YES
        ODD_NUMERIC_LENGTH =     YES
        DATA_TYPE =              4
        NULL_TYPE =              0
        OFFSET =                 41
        NUMBER =                 4
        NEXT_FD =                000000006000
        KD_PTR =                 000000006000
        HASH_KD_PTR =            000000006000
KE <- - - - - - - - - - - - - - - - - - - - - - - 536065006112
-
        TYPE =                   4
        KD_COUNT =               3
        NAME =                   IXSTUDENT
        DUPES_ALLOWED =          YES
        ASCEND_SEQ =             YES
        INDX_NUM =               557
        LENGTH =                 41
        NEXT_KE =                000000006000
        INDX_FE =                536105006112
        KD_PTR =                 536113006112
        KEY_COUNT =              0
        INDEX_RANGE_PTR =        000000000000
```

-continued

```
KD <- - - - - - - - - - - - - - - - - - - - - -536113006112
-
    TYPE =                      5
    KD_TYPE =                   0
    OFFSET =                    0
    FD_PTR =                    535767006112
    NEXT_KD =                   536123006112
    KE_PTR =                    536065006112
    FD_KD_NEXT =                000000006000
KD <- - - - - - - - - - - - - - - - - - - - - -536123006112
-
    TYPE =                      5
    KD_TYPE =                   0
    OFFSET =                    20
    FD_PTR =                    536005006112
    NEXT_KD =                   536133006112
    KE_PTR =                    536065006112
    FD_KD_NEXT =                000000006000
KD <- - - - - - - - - - - - - - - - - - - - - -536133006112
-
    TYPE =                      5
    KD_TYPE =                   0
    OFFSET =                    40
    FD_PTR =                    536023006112
    NEXT_KD =                   000000006000
    KE_PTR =                    536065006112
    FD_KD_NEXT =                000000006000
*** BEGIN TC.RESTRICT ***
NODE <- - - - - - - - - - - - - - - - - - - - -147752006112
-
    Offset from TC =            000000002430
    TYPE =                      9
    OBJECT =                    147762006112
    OP =                        19
    LEFT =                      146022006112
    RIGHT =                     145714006112
TREE LEAF =                     146022006112
TREE LEAF =                     145714006112
*** BEGIN TC.LEAF_BASE ***
LEAF <- - - - - - - - - - - - - - - - - - - - - 145714006112
-
    Offset from TC =            000000000372
    TYPE =                      7
    PRIME_ACCESS =              YES
    ACCESS =                    1
    INDX =                      1
    COUNT =                     2
    NEXT =                      146022006112
    ARG =                       0
        OPERATOR =              0
        OBJECT =                145666006112
    ARG =                       0
        OPERATOR =              145642006112
        OBJECT =
    ARG =                       2
        OPERATOR =              10
        OBJECT =                145704006112
SCARD <- - - - - - - - - - - - - - - - - - - - 145642006112
-
    Offset from TC =            000000000320
    TYPE =                      6
    MODE =                      000000010
    LENGTH =                    5
    SCALE =                     0
    EIS =                       00000000000000000000000000000000
    OBJECT =                    Jones
SCARD <- - - - - - - - - - - - - - - - - - - - 145704006112
-
    Offset from TC =            000000000362
    TYPE =                      6
    MODE =                      000000010
    LENGTH =                    1
    SCALE =                     0
    EIS =                       00000000000000000000000000000000
    OBJECT =
LEAF <- - - - - - - - - - - - - - - - - - - - - 146022006112
-
    Offset from TC =            000000000500
    TYPE =                      7
    PRIME_ACCESS =              YES
```

-continued

```
        ACCESS =                1
        INDX =                  2
        COUNT =                 2
        NEXT =                  150146006112
        ARG =                   0
            OPERATOR =          0
            OBJECT =            145774006112
        ARG =                   1
            OPERATOR =          0
            OBJECT =            145746006112
        ARG =                   2
            OPERATOR =          10
            OBJECT =            146012006112
SCARD <- - - - - - - - - - - - - - - - - - - - 145746006112
-
        Offset from TC =        000000000424
        TYPE =                  6
        MODE =                  001000000
        LENGTH =                1
        SCALE =                 0
        EIS =                   0000000000000000000000000000000000
        OBJECT =                A
SCARD <- - - - - - - - - - - - - - - - - - - - 146012006112
-
        Offset from TC =        000000000470
        TYPE =                  6
        MODE =                  000000010
        LENGTH =                1
        SCALE =                 0
        EIS =                   0000000000000000000000000000000000
        OBJECT =
LEAF <- - - - - - - - - - - - - - - - - - - - - 150146006112
-
        Offset from TC =        000000002624
        TYPE =                  7
        ACCESS =                0
        INDX =                  3
        COUNT =                 2
        NEXT =                  000000006000
        ARG =                   0
            OPERATOR =          0
            OBJECT =            150174006112
        ARG =                   1
            OPERATOR =          0
            OBJECT =            150240006112
        ARG =                   2
            OPERATOR =          10
            OBJECT =            150164006112
SCARD <- - - - - - - - - - - - - - - - - - - - 150240006112
-
        Offset from TC =        000000002716
        TYPE =                  6
        MODE =                  000000010
        LENGTH =                1
        SCALE =                 0
        EIS =                   0000000000000000000000000000000000
        OBJECT =                Jones
SCARD <- - - - - - - - - - - - - - - - - - - - 150164006112
-
        Offset from TC =        000000002642
        TYPE =                  6
        MODE =                  000000010
        LENGTH =                1
        SCALE =                 0
        EIS =                   0000000000000000000000000000000000
        OBJECT =
METHOD <- - - - - - - - - - - - - - - - - - 150070006112
-
        Offset from TC =        000000002546
        TYPE =                  10
        REQUIRED =              YES
        CONJUNCTIVE_APPROACH =  YES
        SIMPLE_RESTRICT =       YES
        INDEX_ONLY_QUALIFY =    YES
        HOLD_SC =               0
        SYSTAB_ROW =            0
        IO_TYPE =               1
        LEFT =                  000000006000
        RIGHT =                 000000006000
```

-continued
| | |
|---|---|
| EC = | 145374006112 |
| FATHER = | 145322006112 |
| CODE_PTR = | |
| PAGE_EST = | |
| ENTITY_EST = | |
| CONTROL = | 150146006112 |
| PRIME = | 146022006112 |
| SECOND = | 000000006000 |
| CURRENT = | 000000006000 |
| PRIME_KEY_TABLE_PTR = | 000000006000 |
| RA_PTR = | 000000006000 |
| CODE_GEN_PTR = | 000000006000 |
| KEY_VALUE_PTR = | 000000006000 |
| TABLE_NAME_LIST_PTR = | 000000006000 |
| TABLE_NAME_LIST_SIZE = | 0 |
| KEY_TT_PTR = | 150174006112 |
| INDEX_PTR | 536065006112 |
APPENDIX III
1. Structure Chart for Code Generation Component Layer Functionality that Generates Code for Cursor Open (SELECT) Operation
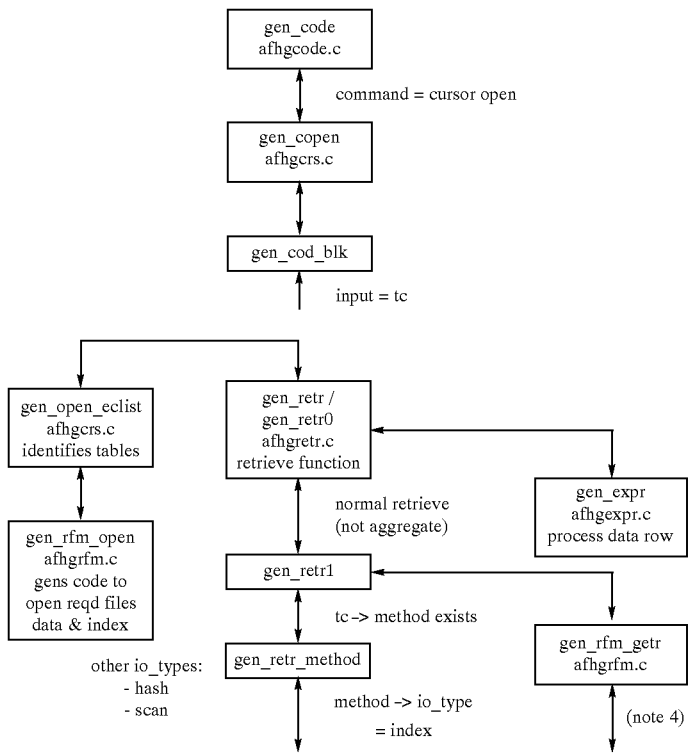

APPENDIX III-continued

1. Structure Chart for Code Generation Component Layer Functionality that Generates Code for Cursor Open (SELECT) Operation

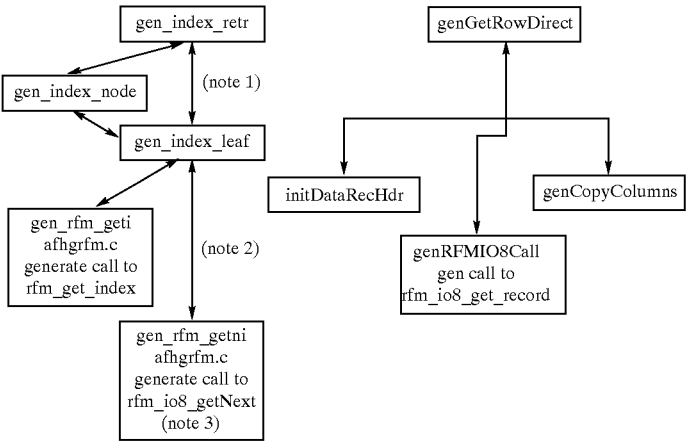

note 1: If method.control points to a node, gen_index_node is called. Otherwise it must point to a leaf in which case gen_index_leaf is called.

note 2: The gen_rfm_getni routine is called when a range of values is being retrieved (e.g., WHERE lastName BETWEEN 'Jones' AND 'Lemke') or when an equal restriction is applied against a non-unique index (e.g., WHERE lastName='Jones').

note 3: gen_rfm_getni generates a call to the subroutine library function rfm_io8_getNext if the bypassRFM configuration option is set on (the default state). Otherwise, if off, it generates a call to the routine that was used previously, rfm_getnext_index.

note 4: When afhgrfrn.c option bypassRFM is enabled (default) the new code that generates the call to the library subroutine rfm_io8_getrecord is made. (This does not show the "old" path).

APPENDIX IV

1. Example of Code Generated to Call the Index Retrieval Subroutine

```
* Initialize the RFM_XPT structure
000366 107122223003 LDX3 0107122, DU
000367 001506443000 SXL3 01506
000370 001542450000 STZ 01542
000371 001543450000 STZ 01543
000372 001544450000 STZ 01544
000373 001545450000 STZ 01545
000374 006000236007 LDQ 06000, DL
000375 001564756000 STQ 01564
000376 001565756000 STQ 01565
000377 001242236000 LDQ 01242 RFM Schema Pointer
000400 001466756000 STQ 01466
****************************************
* Get RFM index entry for record with EC at 502216006112
****************************************
000401 001572635400 EPPR5 01572
000402 000002630404 EPPR0 02, IC
000403 346130710100 TRA RFM_GET_INDEXE-BIAS, , P3
000404 343662710100 TRA RAM_RFM_ERROR-BIAS, , P3
000405 000000116007 CMPQ 00, DL
000406 000767604000 TMI 0767 No More Records
000407 001244756000 STQ 01244 Data Base Key
000410 000426710000 TRA 0426
000411 001432236000 LDQ 01432
000412 001252756000 STQ 01252
```

APPENDIX IV-continued

1. Example of Code Generated to Call the Index Retrieval Subroutine

```
000413 001436236000 LDQ 01436
000414 001250756000 STQ 01250
000415 001434236000 LDQ 01434 IXNUM for Retrieval
000416 001254756000 STQ 01254
****************************************
* Get next RFM index entry for record with EC at 502216006112
****************************************
000417 001602635400 EPPR5 01602
000420 000002630404 EPPR0 02, IC
000421 346260710100 TRA RFM_IO8_GETNEXT-BIAS, , P3 (New Subroutine Library function)
000422 343662710100 TRA RAM_RFM_ERROR-BIAS, , P3
000423 000000116007 CMPQ 00, DL
000424 000406604051 TMI 0406, I No More Records
000425 001244756000 STQ 01244 Data Base Key
* Compare saved key buffer to key returned by RFM
000426 000002227003 LDX7 02, DU
000427 000012336007 LCQ 012, DL
000430 000040106440 CMPC (,RL, ,), (,RL, ,)
000431 001306000017 ADSC9 01306, 0, x7
000432 001460000017 ADSC9 01460, 0, x7
000433 000411600000 TZE 0411 Get next Record
```

Appendix V

1. Code Snippets Utilized by Gen_index_leaf Function for Generating the Call to Retrieve the Next Index Entry Snippet 1— gen_index_leaf The following code sets the transfer offset based on the state of the bypassRFM option then builds the call to the subroutine library.

```
if (bypassRFM)
    calofs=ptr_to_long((void *) rfm_io8_getNext);
else
    calofs=ptr_to_long((void *) rfm_getnext_indexe);
calofs &=0077777000000; . . .
if((sts=putcode(calofs | 0300000710100, RELOC_NONE))
    <0)
    return (sts); /* TRA getix,,p3 */
```

APPENDIX VI

1. Significant Code from the frm_io8_getNext Subrouting I
code snippet 1 - index state tests.
if rfm_xpt.r.key_data_prt is NULL then Search Next has not been called.

```
         ldp      p7,1,,p5              p7 = rfm_xpt                              rfmiwn6m
         ldq      rfm_ky,,p7            if rfm_xpt.r.key_data_ptr                 rfmiwn6m
         cmpq     g8null.dl             is null                                   rfmiwn6m
         tze      rfmnby                ..then skip..                             rfmiwn6m
rfm8bb null                                                                       rfmiwn6m
         ldp      p0,rfm_ix,,p7         if                                        rfmiwn6m
         szn      idx_dp,,p0            last entry was a dup                      rfmiwn6m
         tmi      rfmnby                ..then skip..                             rfmiwn6m
         ldq      idx_cs,,p0            if the currency                           rfmiwn6m
         cmpq     ccancl,dl             was cancelled                             rfmiwn6m
         tze      rfmnby                ..then skip..                             rfmiwn6m
rfm8bc null
         ldq      idx_f1,,p0            fetch the fine level index                rfmiwn6m
         qrl      18                    level for idx_level index                 rfmiwn6m
         qls      1                     multiply by 2 for array index.            rfmiwn6m
         stq      idxlvl-bias,,p4       save for later reference.                 rfmiwn6m
         lxl      x0,idx_ky,q1,p0       if                                        rfmiwn6m
         adlx     x0,1,du               all indexes in this ci                    rfmiwn6m
         cmpx     x0,idx_ky,q1,p0       have been processed,                      rfmiwn6m
         trc      rfmnby                ..then skip (end of index or ci)..        rfmiwn6m
rfm8bd null                                                                       rfmiwn6m
         als      0                     if no io8 call mandated,                  rfmiwn6m
         tze      rfm8go                ..then skip..                             rfmiwn6m
``` code snippet 2 - IO8 Call to guarantee the fine level index CI state.

```
rfm8be null                                                                       rfmiwn6m
*                                                                                 rfmiwn6m
*        s7918d call io8 to get another copy of the fine level index ci.          rfmiwn6m
*                                                                                 rfmiwn6m
         lda      idx_rp,,p0            a = index rap number                      rfmiwn6m
         ana      -1,dl                 a 18-35 = index rap number                rfmiwn6m
         ldq      idx_dk,q1,p0          q = dbkey.                                rfmiwn6m
         ldp      p7,rfm_sp,,p7         p7 = schema pointer                       rfmiwn6m
         ldp      p1,filecb,,p7         p1 = io_xpt pointer                       rfmiwn6m
*                                                                                 rfmiwn6m
*        set file info io_xpt                                                     rfmiwn6m
         ldp      p0,prtptr,,p7         p0 = partition pointer table ptr.         rfmiwn6m
         sbla     lo_ptn,,p0            a = rap index (ref getdbk_set_ptrs)       rfmiwn6m
         als      1                     a = index into partition ptr table.       rfmiwn6m
         ldp      p6,ptn_ar,al,p0       p6 = rfm_file_control pointer.            rfmiwn6m
*                                                                                 rfmiwn6m
*        calc the ci number and line number (ref get_dbk)                         rfmiwn6m
*        q = dbkey.                                                               rfmiwn6m
         adlq     dbk_ci,,p6            inc by adjustment constant.               rfmiwn6m
         div      lpci,,p6              div by lines per ci.                      rfmiwn6m
         stq      ci_num,,p1            save ci number for fetch in io_xpt.       rfmiwn6m
*                                                                                 rfmiwn6m
*        set the filecode_id                                                      rfmiwn6m
         lxl      x7,fc_id,,p6          copy the                                  rfmiwn6m
         sxl      x7,ifc_id,,p1         filecode id.                              rfmiwn6m
*                                                                                 rfmiwn6m
*        call io8 via io_xpt.enter.read_ci passing io_xpt in the a reg.           rfmiwn6m
rfm8cl null
         lda      filecb,,p7            a = ptr to io_xpt                         rfmiwn6m
         sta      io_ptr-bias,,p4                                                 rfmiwn6m
         ldp      p1,readci,,p1         p1 = readci io8 function pointer          rfmiwn6m
         ldx      x0,stfsiz,du          x0 = stack size.                          rfmiwn6m
         eppr0    *+3                   p0 = return.                              rfmiwn6m
         tra      0,,p1                 call io8                                  rfmiwn6m
         zero     1,0                   passing 1 arg.                            rfmiwn6m
``` code snippet 3 - Test CI control words for change.

```
rfm8go null                                                                       rfmiwn6m
*                                                                                 rfmiwn6m
         lda      rfm_ky,,p7            a = ptr to key.                           rfmiwn6m
         ana      =o7777,d1             strip all but segid (start of ci)         rfmiwn6m
         sta      temp-bias,,p4         then save.                                rfmiwn6m
         ldp      p6,temp-bias,,p4      p6 = pointer to ci.                       rfmiwn6m
         ldp      p0,2,,p5              p0 = area to store ci header info.        rfmiwn6m
```

APPENDIX VI-continued

```
rfm8b1 null                                                              rfmiwn6m
    ldaq    0,,p6         if ci header word 0 and 1 changed              rfmiwn6m
    cmpaq   0,,p0            ..then skip..                               rfmiwn6m
    tnz     rfmnby                                                       rfmiwn6m
    ldaq    2,,p6         if ci header word 2 or 3 changed               rfmiwn6m
    cmpaq   2,,p0            ..then skip..                               rfmiwn6m
    tnz     rfmnby                                                       rfmiwn6m
code snippet 4 - Duplicate entry test.
rfm8b2 null                                                              rfmiwn6m
    ldp     p0,rfm_ix,,p7    p0 = idx_tbl pointer                        rfmiwn6m
    lxl     x0,idx_k1,,p0    x0 = size of key (includes rap)             rfmiwn6m
    ldp     p6,rfm_ky,,p7    set p6 to next index entry                  rfmiwn6m
    a9bd    1,x0,p6          inc by size of dbkey + key                  rfmiwn6m
    rem                         where 1 in y field = 4 bytes.            rfmiwn6m
rfm8tb null
    mlr     (ar,,,x0),(ar)   copy the dbkey                              rfmiwn6m
    adsc9   0,,4,p6             to dbkr.                                 rfmiwn6m
    adsc9   dbkr-bias,,4,p4  the dup flag is a bit 0 of dbkey.           rfmiwn6m
    szn     dbkr-bias,,p4    if set                                      rfmiwn6m
    tmi     rfmnby              ..then skip..                            rfmiwn6m
code snippet 5 - Fetch index entry from the fine level CI and copy
it to the generated code's key buffer.
rfm8db null                                                              rfmiwn6m
    stp     p6,rfm_ky,,p7    save pointer to this dbkey.                 rfmiwn6m
*                                                                        rfmiwn6m
*   return next key to codegen then do accounting.                       rfmiwn6m
    ldp     p5,rfm_kr,,p7    p5 = key return pointer                     rfmiwn6m
    mlr     (ar,r1),(ar,r1)  move key contents                           rfmiwn6m
    adsc9   0,,x0,p6            including rap if partitioned             rfmiwn6m
    adsc9   0,,x0,p5            to key buffer.                           rfmiwn6m
*                                                                        rfmiwn6m
rfm8ok null                                                              rfmiwn6m
    lda     idxlvl-bias,,p4  a = index into idx_level                    rfmiwn6m
    aos     idx_ky,a1,p0     inc the key currency key id.                rfmiwn6m
    ldq     dbkr-bias,,p4    set the current                             rfmiwn6m
    stq     idx_dp,,p0          dbkey in the idx structure.              rfmiwn6m
    tra     i8nret           take the normal return.                     rfmiwn6m
code snippet 6 - RFM call.
*                                                                        rfmiwn6m
*   call rfm because an exception was detected.                          rfmiwn6m
*                                                                        rfmiwn6m
rfmnby null  call rfm                                                    rfmiwn6m
    lda     1,,p5            ar = ptr to xpt                             rfmiwn6m
    ldx0    stfsiz,du        x0 = size of current fram                   rfmiwn6m
    ldp1    ixnptr           p1 = addr of rfm routine                    rfmiwn6m
    eppr0   *+3              p0 = return from rfm                        rfmiwn6m
    tra     0,,p1            go to rfm                                   rfmiwn6m
    zero    1,0              1 argument, 0 attrib's                      rfmiwn6m
    stq     savq-bias,,p4    save return indicator                       rfmiwn6m
    ldp5    savp5-bias,,p4   reload p5                                   rfmiwn6m
* check for errors from rfm                                              rfmiwn6m
    lda     savq-bias,,p4    was it alt return                           rfmiwn6m
    tnz     rfm8er           yes - skip                                  rfmiwn6m
code snippet 7 - Save the CI header control words.
*                                                                        rfmiwn6m
*   save the ci header info.                                             rfmiwn6m
*   the ci is not locked. therefore, it can change out from under        rfmiwn6m
*   get_next calls, to detect change, this information will be           rfmiwn6m
*   used to validate that the ci referenced in the next get_next         rfmiwn6m
*   call is the same one that was accessed on this call. Otherwise,      rfmiwn6m
*   the ci would have to be locked (and unlocked).                       rfmiwn6m
*                                                                        rfmiwn6m
rfm8nr null                                                              rfmiwn6m
    ldp     p7,1,,p5         p7 = rfm_xpt                                rfmiwn6m
    lda     rfm_ky,,p7       if rfm_xpt.r.key_data_ptr                   rfmiwn6m
    cmpa    g8null,dl           is null                                  rfmiwn6m
    tze     i8nret              ..then skip..                            rfmiwn6m
    ana     =o7777,dl        strip all but segid (start of ci)           rfmiwn6m
    sta     temp-bias,,p4       then save.                               rfmiwn6m
    ldp     p6,temp-bias,,p4 p6 = pointer to ci.                         rfmiwn6m
    ldp     p7,2,,p5         p7 = area to store ci header info.          rfmiwn6m
    ldaq    0,,p6            copy ci header info                         rfmiwn6m
    staq    0,,p7               for later reference.                     rfmiwn6m
    ldaq    2,,p6                                                        rfmiwn6m
    staq    2,,p7                                                        rfmiwn6m
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method for enhancing the performance of a data manager that manages a relational database, the manager having a number of operatively coupled component layers for performing functions required for accessing the relational database file records in response to user query statements, the number of component layers including a first component layer for generating output code used in executing the query statement in response to input representing an optimized form of the query statement and a number of lower component layers, the method comprising the steps of:

(a) adding an index processing performance enhancing subroutine to a subroutine library included within the first component layer, the index processing performance enhancing subroutine being designed to execute index processing functions performed by lower component layers substantially faster than if the function were executed by the lower component layers, and including code for determining conditions under which the particular subroutine is to be invoked during query execution time;

(b) including calls in the generated output code to the index processing enhancing subroutine in place of normally included calls to the lower component layers for inserting the index processing enhancing subroutine into the generated code; and, (c) including logic within the index processing enhancing subroutine for determining if the index processing enhancing subroutine can be reliably invoked based on a predetermined set of conditions.

2. The method of claim 1 wherein the calls included in the generated output code are in place of normally included calls to a prior index processing subroutine that unconditionally invoked lower component layers.

3. The method of claim 1 wherein the predetermined set of conditions indicate that there were no changes in index currency and in a fine level index used for retrieving the database file records.

4. The method of claim 3 wherein the fine level index contains entries that are lightly packed adjacent to one another in sorted order enabling the logic in the index processing enhancing subroutine to walk through the fine level index taking entries right out from under control of one of the number of lower component layers as search next requests are being processed.

5. The method of claim 4 wherein the first component layer includes a code generation component and the one of the lower component layers includes a relational file manager (RFM) component having a library for storing a number of routines for performing the lower layer index functions.

6. The method of claim 5 wherein the number of lower component layers further includes a third lower component layer operatively coupled to the first component layer, to the second lower component layer and to the relational database for executing input/output operations required for executing the query statement.

7. The method of claim 6 wherein in step (c), the first component layer invokes the index processing performance subroutine to call conditionally, the third lower component layer function based on the setting of a result processing indicator.

8. The method of claim 7 wherein the third lower component layer includes an input/output controller component that operatively couples to the relational database.

9. The method of claim 1 wherein the index processing enhancing subroutine is coded for performing a number of different index state tests for determining the set of predetermined conditions.

10. A data manager for managing a relational database, the manager having a number of operatively coupled component layers for performing functions required for accessing database file records of the relational database in response to user query statements, the number of component layers including a first component layer for generating output code used in executing the query statement in response to input representing an optimized form of the query statement and a number of lower component layers operatively coupled to the first component layer, to each other and to the relational database, the lower component layers, the first component layer further including:

(a) a subroutine library including an index processing performance enhancing subroutine designed to execute functions performed by lower component layers substantially faster than if the functions were executed by the lower component layers, the index processing subroutine including coded logic for determining conditions under which the subroutine is to be executed;

(b) the generated output code being stored in memory and including calls to the index processing subroutine stored in the subroutine library in place of normally included calls to a prior index processing subroutine that unconditionally invoked lower component layers; and, (c) the generated output code when accessed from memory during execution of the query invoking the index processing subroutine to perform the lower layer functions.

11. The data manager of claim 10 wherein the particular conditions indicate there were no changes in index currency and in a fine level index used in retrieving the database file records.

12. The data manager of claim 11 wherein the fine level index contains entries that are lightly packed adjacent to one another in sorted order enabling the coded logic to walk through the fine coded level index taking entries out from under control of the second lower component layer.

13. The data manager of claim 12 wherein the first component layer includes a code generation component and the second lower component layer includes a relational file manager (RFM) component having a library for storing a number of routines for performing the index processing functions utilizing the fine level index.

14. The data manager of claim 13 wherein the number of lower component layers further includes a third lower component layer operatively coupled to the first component layer, to the second lower component layer and to the relational database for executing input/output operations required for executing the query statement.

15. The data manager of claim 14 wherein in the first component layer during the execution of the query invokes the index processing subroutine to invoke the third lower component layer function when a result processing indicator has been set.

16. The data manager of claim 15 wherein the third lower component layer includes an input/output controller component that operatively couples to the relational database.

17. An RDMS program product including a data manager for managing a relational database stored on a media as groups of program instructions, the instructions corresponding to a number of operatively coupled component layers for performing functions required for accessing database file records of the relational database in response to user query statements, the number of component layers including a first component layer for generating code used in executing the query statement in response to input representing an optimized form of the query statement and a number of lower component layers operatively coupled to the first component layer, to each other and to the relational database, the first component layer further including:

(a) a first group of instructions corresponding to a subroutine library that includes an index processing performance enhancing subroutine designed to execute functions performed by lower component layers substantially faster than if the functions were executed by the number of lower component layers, the index processing performance enhancing subroutine including code containing instructions for determining conditions under which the particular subroutine is to be executed;

(b) a second group of instructions corresponding to a code generation component for providing output code containing calls to the index processing performance enhancing subroutine in place of normally included calls to lower component layers that inserts the index processing subroutine into the output code; and, (c) another group of instructions included within the index processing subroutine for causing the execution of the index processing subroutine to perform the second lower layer functions based on a particular set of conditions resulting in increased performance.

18. A memory for storing a data manager for accessing data records of a relational database during the execution of a query, the memory comprising:

(a) first component layer for generating code used in executing the query statement in response to input representing an optimized form of the query statement and a number of lower component layers operatively coupled to the first component layer, to each other and to the relational database, the lower component layers, the first component layer contained in the memory further including:

(1) a subroutine library including an index processing performance enhancing subroutine designed to execute functions performed by lower component layers substantially faster than if the functions were executed by the lower component layers, the row retrieval performance enhancing subroutine including code for determining conditions under which the particular subroutine is to be invoked during index processing;

(2) generated output code including calls to the index processing performance enhancing subroutine in place of normally included calls to the lower component layers for incorporating the index processing subroutine into the generated output code for execution of the query being processed; and, (3) a memory area being assigned for storing the output code, the output code accessed during execution of the query causing the index processing subroutine to be executed for performing the lower layer functions as a function of a particular set of conditions so as to result in increased performance.

* * * * *